(12) United States Patent
Wall et al.

(10) Patent No.: US 12,356,979 B2
(45) Date of Patent: Jul. 15, 2025

(54) SENSORY OUTPUT AND LOCATION MONITORING SYSTEM AND METHOD

(71) Applicant: Glenn A Wall, Rosendale, MO (US)

(72) Inventors: Glenn A. Wall, Rosendale, MO (US); Greg L. Corpier, Sedalia, MO (US)

(*) Notice: Subject to any disclaimer, the term of this patent is extended or adjusted under 35 U.S.C. 154(b) by 46 days.

(21) Appl. No.: 18/271,388

(22) PCT Filed: Jan. 7, 2022

(86) PCT No.: PCT/US2022/011641
§ 371 (c)(1),
(2) Date: Jul. 7, 2023

(87) PCT Pub. No.: WO2022/150604
PCT Pub. Date: Jul. 14, 2022

(65) Prior Publication Data
US 2024/0057584 A1    Feb. 22, 2024

Related U.S. Application Data

(60) Provisional application No. 63/134,675, filed on Jan. 7, 2021.

(51) Int. Cl.
*A01M 31/00* (2006.01)
(52) U.S. Cl.
CPC .................. *A01M 31/002* (2013.01)
(58) Field of Classification Search
CPC ............................................ A01M 31/002
USPC ....................................................... 340/573.2
See application file for complete search history.

(56) References Cited

U.S. PATENT DOCUMENTS

| | | | | |
|---|---|---|---|---|
| 5,901,490 A * | 5/1999 | Lush | .................. | A01M 31/008 43/1 |
| 6,209,252 B1 * | 4/2001 | McGough | .......... | A01M 31/008 43/1 |
| 6,398,126 B1 * | 6/2002 | Pitchford | ................. | A43B 3/16 239/57 |
| 6,592,104 B2 * | 7/2003 | Cox | .................... | A01M 1/2055 261/26 |
| 7,434,541 B2 * | 10/2008 | Kates | .................... | A01K 15/02 119/908 |
| 7,690,540 B1 * | 4/2010 | Owens | ................ | A01M 31/008 222/642 |
| 8,181,826 B2 * | 5/2012 | Wainwright | ........ | A01M 1/2038 43/2 |

(Continued)

OTHER PUBLICATIONS

"International Search Report and Written Opinion PCT/US2022/011641".

*Primary Examiner* — Eric Blount
(74) *Attorney, Agent, or Firm* — Mark E. Brown

(57) ABSTRACT

A sensory output and monitoring system includes a central processing unit (CPU) configured for receiving inputs and providing outputs. A sensor provides input to said CPU in response to detecting at least one of an object, in animal and an individual. A sensory output is connected to and activated by output from said CPU and is configured for dispensing at least one of an olfactory, audible and visual output. A power supply for the system can include a solar cell and a battery for placement in remote, off-grid locations. A method of providing sensory output and monitoring movement and location of at least one of objects, animals and individuals is provided.

7 Claims, 25 Drawing Sheets

(56) References Cited

U.S. PATENT DOCUMENTS

| | | | | |
|---|---|---|---|---|
| 8,905,667 | B1* | 12/2014 | Burks | A01M 31/00 |
| | | | | 224/148.1 |
| 10,327,439 | B1* | 6/2019 | Kostek | A01M 31/008 |
| 10,398,130 | B2* | 9/2019 | Birch | A01K 11/006 |
| 11,419,327 | B2* | 8/2022 | Charles | A01M 31/008 |
| 12,121,018 | B2* | 10/2024 | Heffington | A01M 31/008 |
| 2008/0159079 | A1* | 7/2008 | Dir | A01M 31/002 |
| | | | | 119/719 |
| 2010/0050494 | A1* | 3/2010 | Zampetis | A01M 31/002 |
| | | | | 43/2 |
| 2013/0068783 | A1* | 3/2013 | Gasper | B65D 83/68 |
| | | | | 222/162 |
| 2013/0135512 | A1 | 5/2013 | Kim et al. | |
| 2015/0096500 | A1* | 4/2015 | McCain | A01M 31/004 |
| | | | | 119/719 |
| 2016/0310624 | A1* | 10/2016 | Wynalda, Jr. | A01M 1/2088 |
| 2018/0117203 | A1* | 5/2018 | Gruenbacher | A01M 1/2077 |
| 2018/0249561 | A1* | 8/2018 | Recker | H05B 47/105 |
| 2018/0310526 | A1* | 11/2018 | Birch | A01M 29/00 |
| 2020/0215219 | A1* | 7/2020 | Becker | A61L 2/00 |

* cited by examiner

SENSORY OUTPUT AND LOCATION MONITORING SYSTEM AND METHOD

CROSS-REFERENCE TO RELATED APPLICATIONS

This application claims priority in International Application No. PCT/US2022/011641, filed Jan. 7, 2022, which claims priority in U.S. Provisional Patent Application No. 63/134,675, filed Jan. 7, 2021, which is incorporated herein by reference.

BACKGROUND OF THE INVENTION

1. Field of the Invention

The present invention relates generally to remote monitoring and control systems, and particularly to an app for hunting and fishing activities, which can be configured for remotely dispensing scents for attracting game and masking human scents.

2. Description of the Related Art

Hunters and trappers commonly use scents for attracting game and masking human odors. Such scents are commonly applied in liquid and aerosol forms in and around hunting blinds, traps and scrapes. For example, doe urine can be applied for attracting bucks. Buck urine can also attract bucks, which commonly investigate areas where they suspect other bucks may be encroaching on their territories. Masking substances are typically used for neutralizing human odors, which can alert game animals to the past or present presence of humans, e.g., trappers and hunters.

Hunters and trappers typically spray and sprinkle game and masking scents manually, for example, around blinds in preparation for a hunt and in setting traps. However, such manual applications were time-consuming, wasteful of the scent and masking products and often alerted game animals to human presence. In an embodiment of the present invention, a scent distributing system can be provided using smart devices for controlling dispensers strategically placed in field locations frequently visited by game, e.g., around blinds and traps.

Other exemplary applications of the present invention include fishing activities, security monitoring and tracking movements of objects, individuals and animals. Heretofore there has not been available a system or method for providing sensory output and location monitoring with the advantages and features of the present invention. Moreover, the system can dispense animal repellents. For example, mace can be dispensed to repel bears.

BRIEF SUMMARY OF THE INVENTION

This invention generally provides a system for distributing game-attracting and human-masking scents using smart communications devices. Moreover, game movement in the vicinity of scent dispensers can be monitored and recorded, e.g, for planning future hunts. Remotely-controlled scent dispensing devices can be strategically placed for maximum benefit. Various smart devices and sensors can be utilized and controlled with the system and method of the present invention. Moreover, usage of outputs, such as deer urine, can be optimized with sensors and dispensers.

The invention is a scent dispensing and monitoring unit that can be either tree mounted or pole mounted in the desired area. The system's primary purpose is to dispense a scent of choice at predetermined times selected by the user. For example, this can give a hunter the opportunity to figure out the pattern of the target animal and/or change the pattern of the target animal. This invention can provide hunters with the ability to release scents daily in target areas without human interaction. The continuous refreshing of scent, without the human presence, will allows hunters to draw target animals on-property at specific times, by periodically releasing the desired scents anytime throughout 24-hour daily cycles. Releasing small quantities of the desired scents can lure target animals to desired areas. The invention uses motion sensors and cameras to monitor the animals' patterns in the area of the system. Many animals use smells during certain times of the year to identify and locate the opposite sex for breeding purposes. Hunters and trappers commonly use scents for hunting and trapping.

Heretofore there have not been systems configured to enable hunters and trappers to release scents regularly on demand when desired in various times and locations, without human interaction in the designated area. Similar products like the drip bag release a scent constantly until the product is empty. This means the drip bag will also release scent in the desired hunting area during undesired times. The drip bag can also freeze causing it to not work properly. Products like the buck bomb is a one-time use only scent dispenser that the hunter has to be present for at the time of use. This means the hunter has to be present to use this product, and the hunter will not be able to maintain the fragrance without being present. There are also remote-control style products that release scent, but again the hunter has to be present and a certain distance from the dispenser to operate the product. Products like these only introduce a scent while the hunter is present. The present invention enables hunters to introduce and maintain a scent of their choosing without being in the area.

Cover scents are used by some hunters, but their main purpose is to mask hunter smells. By using present invention. Hunters and trappers will be able to introduce and maintain the desired fragrance of their choosing before and during the hunting season making the fragrance a normal odor to the target animal. Once the desired scent level is obtained, hunters can arrive in their hunting areas without alarming the target animals.

Scent-based hunting products currently available generally do not enable pre-scenting hunting areas with the advantages, features and effectiveness of the present invention. The present invention can provide hunters and trappers with the advantages of pre-scenting locations where game animals are likely to be encountered.

Because of the numerous locations and species to be hunted, the system will be equipped with a cellular modem for communication where practical, and an external satellite communication system if used in remote locations that do not have cell service. The system of present invention is adaptable worldwide.

A business model for commercializing the present invention would involve users paying monthly fees and usage fees, which can be charged for the communications links and portals that can be accessed by either a computer or a cell phone. The portal will allow the control of multiple devices and will store photos from the cameras as well as motion data, scent levels, battery levels, solar charging as sell as environmental conditions such as temperature, humidity, and light levels. The user can also manually dispense scent, set schedule for dispensing, adjust sensitivity of sensors and camera and manage captured images.

Because of the extreme environmental conditions the units may be subjected to, a heating system is designed into the unit to keep the scent tank, pump, plumbing and dispensing nozzle from freezing. This requires a large power source, so an external battery and solar array are utilized, these can be set on the ground and placed in a sunny location to recharge. The unit includes a small solar panel and Lithium-ion battery.

Based on an analysis of process needs, environmental conditions, power requirements, programmability, interface requirements and reliability, the combination of an ESP32 microcontroller and a Blues wireless notecard and notecarrier are currently considered acceptable for processors and exterior connectivity.

The extreme environmental conditions the unit is required to operate in required the addition of a thermal management system, including temperature and humidity sensors, along with ceramic thermal resistive heating elements powered by PWM adaptive control.

The system utilizes a passive infrared motion sensor array that is capable of measuring an object's temperature and a 5 mp camera to provide the photographic tracking and game count. A memory card is used to store and forward video images along with other data to the main server over cellular connectivity, along with near location communications with phone apps through Bluetooth low energy protocols.

A diaphragm pump is used to move small quantities of scent through a nozzle for dispersion. The pump is controlled by PWM signals from the microcontroller to dispense specific amounts at specific times. Software calculates the amount of scent liquid and notifies owner when refill of scent is needed.

The scent dispenser can be controlled by both a wifi app on phone for local near proximity control and cellular app for remote operations and control. Communications protocols and encryption are handled within the device by the blues component. Communications are through a TCP packet protocol utilizing port 51122.

Software in the device is composed of a master control package written in C#running on the ESP and a communications management/security program running on blues wireless controller. The security protocol consists of a two-key encryption algorithm along with conventional tunneling VPN protocols.

During normal operations, the unit will directly communicate with the servers over cellular networks, where all parameters are stored, along with camera images and activity logs. During setup and close distance operations, the unit will transfer to wifi and directly connect to users' phone or tablet.

There are three major software modules used for the project, the first central application is the server side functions, where all data is stored. The second module is the mobile/web application that utilizes the server databases and business logic to create a similar but limited application to view and modify parameters of operation for the individual scent dispensers. The third module is the camera software that determines if a photo should be taken, the actual photographic capture and storing and forwarding of images. Basic parameters for each scent dispenser include type of scent, quantity of scent, schedule that includes time and amount of scent to dispense, motion sensitivity, camera images, schedule of times to communicate with server, number of local images stored, alert levels for battery voltage, scent low amount, excessive activity and excessive temperatures. Additional parameters include temperature set point for heaters (or 0 if no external battery attached), external battery alert triggers and Bluetooth activation alerts.

Onboard processing of temperature and humidity are used to calculate the intensity of the heating elements and duration of heat cycles by producing a PWM signal to control the heaters. The set point for heating can be adjusted for different environments and scent characteristics.

Conventional trail cameras and security cameras use passive infra-red (PIR) detectors to detect motion and trigger the camera to record an image or video. This technique works well if you are looking for any type of motion or minimal change in IR average levels to trigger the system, but especially for the hunter, this technique creates many "false positive images". These "False positives" can be caused by a leaf, limb or piece of trash being blown by the wind, along with images because the sun comes out from behind clouds and the average IR value increases.

The present invention utilizes a grid of IR cells in a matrix looking at the same area as the visible light camera, each cell can be set to IR thresholds relating to temperature. This means only objects with a temperature within the range (for example 90-94 degrees Fahrenheit) will trigger the cell. Upon detection of a heat source within temperature range, the camera will activate the camera, check light levels and if they are below a certain level, will activate the IR flood array, it will then take one picture. The unit will then go back to sleep until the heat source moves to another cell of the array, indicating motion, and the camera will follow the above procedure and capture another image. This reduces the number of false triggers greatly.

To minimize the effect of sunlight or strong winds, the unit will take a reading of all of the IR sensors in the array, average the readings, and adjust the sensitivity of the IR sensors based on the overall average IR levels (the background average temperature).

In the current implementation of this technique, the view area is divided into 64 cells arranged in array of 8×8 cells. A trigger threshold is defined (the lowest body temperature of any selected animal type) and an interrupt is generated when any cell detects temperature above this threshold. The control processor for the system then retrieves the levels of each cell and determines if an image should be captured by the optical camera. This interrupt driven approach allows the system to go into a low power "sleep" state until an interrupt occurs, greatly reducing the power required by the system and allowing for the use of more power-hungry algorithmic computations to be made thus reducing the false triggers while allowing longer battery life. The images are then transmitted to the user via applicable media (Cellular, Bluetooth, Wi-Fi or Loran). This innovation greatly reduces the bandwidth required by reducing false images, lowers battery consumption, allows for more processor intensive algorithms to be used in the image screening process, along with the frustration of the user having to review numerous "empty images."

The software contains a table of the body temperatures of common game animals, from which the user chooses one or more for the cameras triggering selection. If multiple animals are chosen, their body temperature ranges will be combined and used for camera triggering.

At preset times or when photo buffer reaches a set amount, the dispenser will power up the cellular modem and connect and send photos and IR activity logs along with temp and humidity logs to the server. While connected to the server, any updates to parameters will be also be downloaded. Once images are uploaded to the server, they will be ran through the object identifier algorithms and stored if a valid object is detected. The stored images are contained in a photo album style for review by user.

Other applications of the present invention include fishing activities and applications for audible output devices. Locations and movements of objects, animals and individuals can be monitored.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Game Scent Dispensing and Monitoring System Preferred Embodiment

Figure 1:
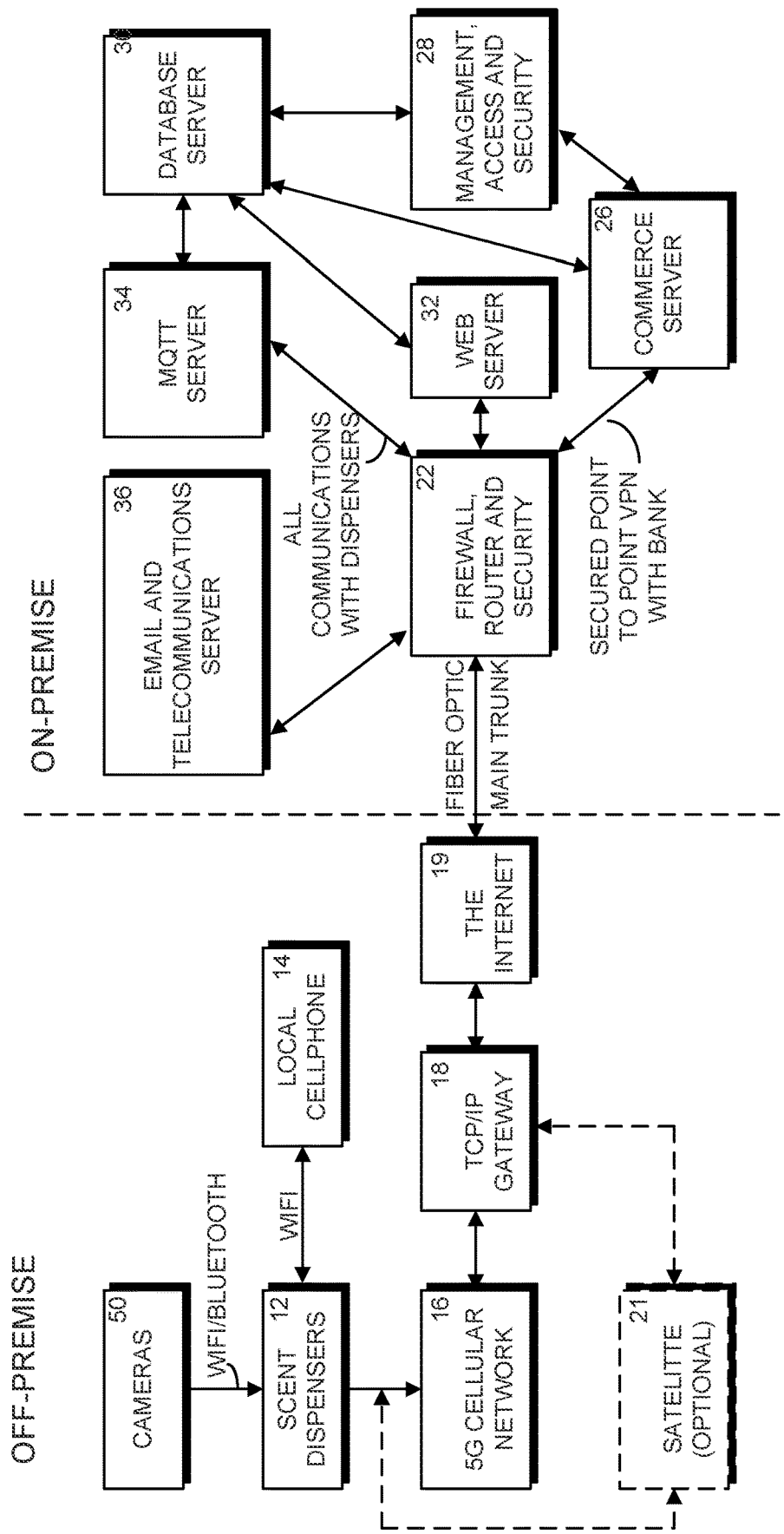
FIG. 1 is a diagram of a sensory output and location monitoring system embodying the present invention.

A system for dispensing sensory outputs and monitoring comprising an exemplary embodiment of the present invention is shown in FIG. 1 and is generally designated by the reference numeral 10. Without limitation, the system 10 can include off-premise field components, including a scent dispenser 12, which can connect to a telecommunications device 14, such as a cell phone via a Wi-Fi or other connection. The scent dispenser 12 can also connect to a cellular (e.g., 5G) network 16, which can connect to a TCP/IP gateway 18, which in turn can connect to the Internet worldwide network, i.e., the "Cloud" 19. Optionally, the connection from the TCP/IP (transfer control protocol/internet protocol) gateway 18 to the scent dispenser 12 can be via a telecommunications satellite 21.

The off-premise field components can include global navigation satellite system (GNSS) location components, including transmitters and receivers. A common GNSS system in the United States is the global positioning system (GPS), which is maintained by the U.S. Air Force. GPS satellite positioning signals are commonly used in many applications, including navigation worldwide, machine control and positioning with sub-centimeter precision. For example, many "smart" personal communications devices include GPS positioning capabilities.

On-premise components can connect to the off-premise field components via a fiber-optic main trunk 23 or other suitable connection. The on-premise components can include a commerce server 20, which can connect to firewall, router and security components 22 via a secure point-to-point virtual private network (VPN) 24, which in turn connects to a commerce server 26. The commerce server 26 can be configured to handle user subscription payments, and can securely retain credit and debit card information. Management, access and security can be provided at 28 and connect to a database server 30 connected to a web server 32 and an MQTT server 34, which can be configured for artificial intelligence (AI). An email and telecommunication server 38 is connected to the firewall router and security component 22.

Figure 2:
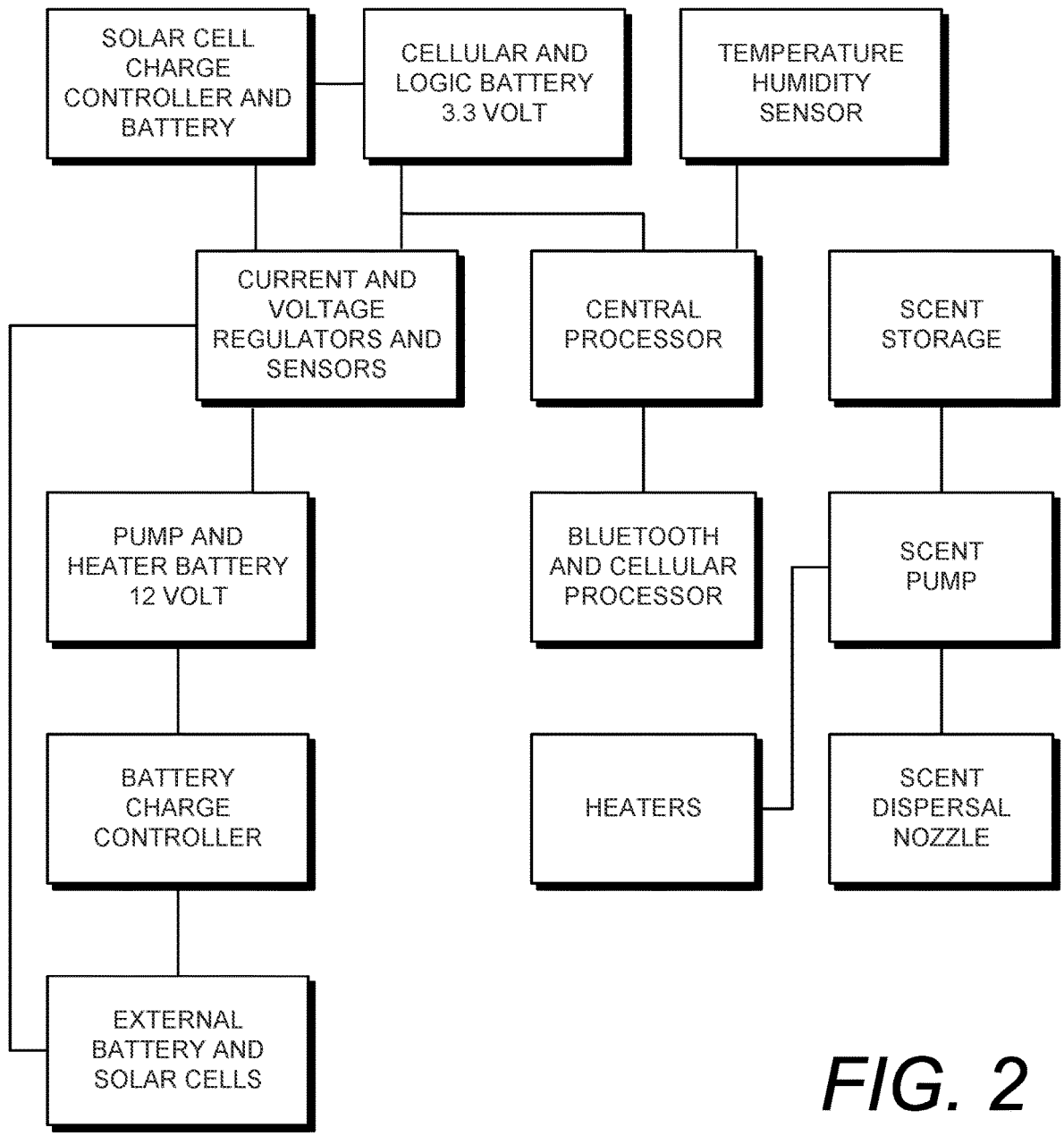
FIG. 2 is a diagram showing the scent dispenser major subsystems.

FIG. 2 shows the major subsystems of the scent dispenser 12. Without limitation on the generality of useful subsystems comprising the scent dispenser 12, the configuration shown in FIG. 2 can be adapted for placement on site, e.g., near game in areas where hunting is permitted. For example, the scent dispenser 12 can be strapped to the trunk of a tree for optimal, secure placement. One or more cameras 50 can be placed at locations selected to optimize game animal image captures.

Figure 3:
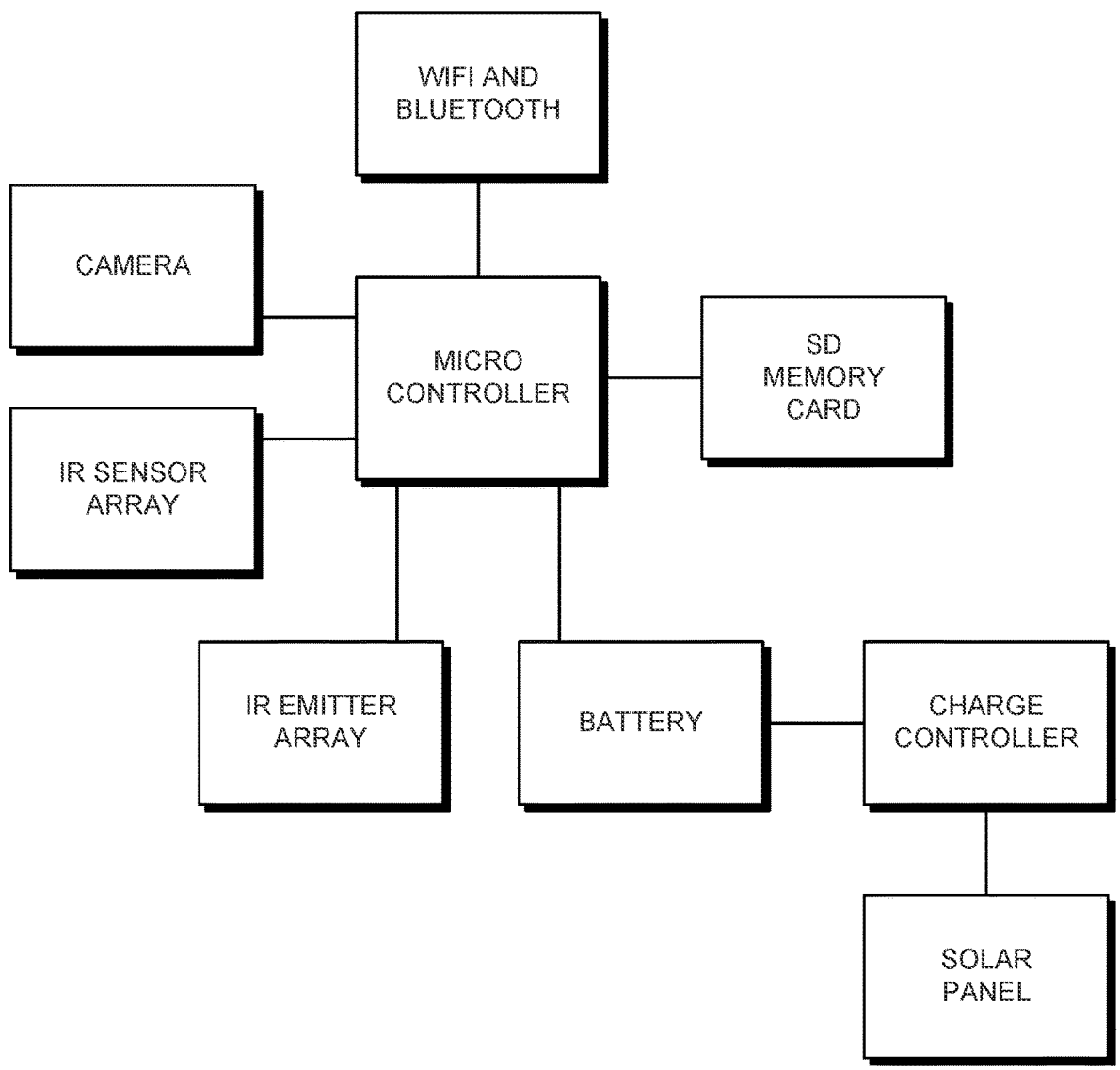
FIG. 3 is a diagram showing an external camera and infrared (IR) sensors.

FIG. 3 shows the scent dispenser 12 configuration, which can include an ESP 32 microcontroller. Input can be provided by a camera and an infrared sensor array (e.g., 8×8). An IR emitter array is provided for illuminating a target, such as a game animal, for image capture by the camera. The microcontroller can be programmed for discerning various game animal species, whereby only species of interest are photographed, tracked and reported.

The scent dispenser 12 can be powered by an electrical power source, such as a solar cell and/or a battery, which can be configured for remote, off-grid locations. In addition to the passive infrared sensor array and a camera 22, video devices, such as "Spy Cams," can record and transmit images of nearby game animals, individuals and objects. Data storage and backup can include various digital devices, such as a Scan Disc (SD) memory card.

The system 10 accommodates remote control and operation of animal detection and tracking systems placed in the field. Hunters can interactively communicate with components of the system 10 and with each other. Game harvests can thus be optimized for individual hunters and groups using such information for effective planning and coordination. Safer hunting can also be achieved by providing more comprehensive intelligence on anticipated game animal movements and repetitive patterns of behavior.

Ambient atmospheric temperature and humidity can affect airborne scent dispersion. The central processor 12 can be preprogrammed to optimize such operating variables whereby game scents are dispersed efficiently for maximum effect. For hunting applications, multiple game animals can be attracted to predetermined locations at specific times. Game animal behavior patterns can thus be reinforced for achieving successful harvests, because hunters can reliably predict the animals' presence.

Other sensory outputs can be utilized with the system 10. For example, audible outputs, such as game calls, verbal communications and audible alarms can be utilized. Moreover, visual outputs, comprising lights and images can also be utilized. Combinations of such sensory outputs can be accommodated by the system and method of the present invention. For example, olfactory output, such as deer urine, can be combined with audible, game call output. Moreover, visible output, comprising lights, can be utilized for fishing activities. Animal repellents, such as mace for repelling bears, can also be dispensed.

III. Operation

Figure 4:
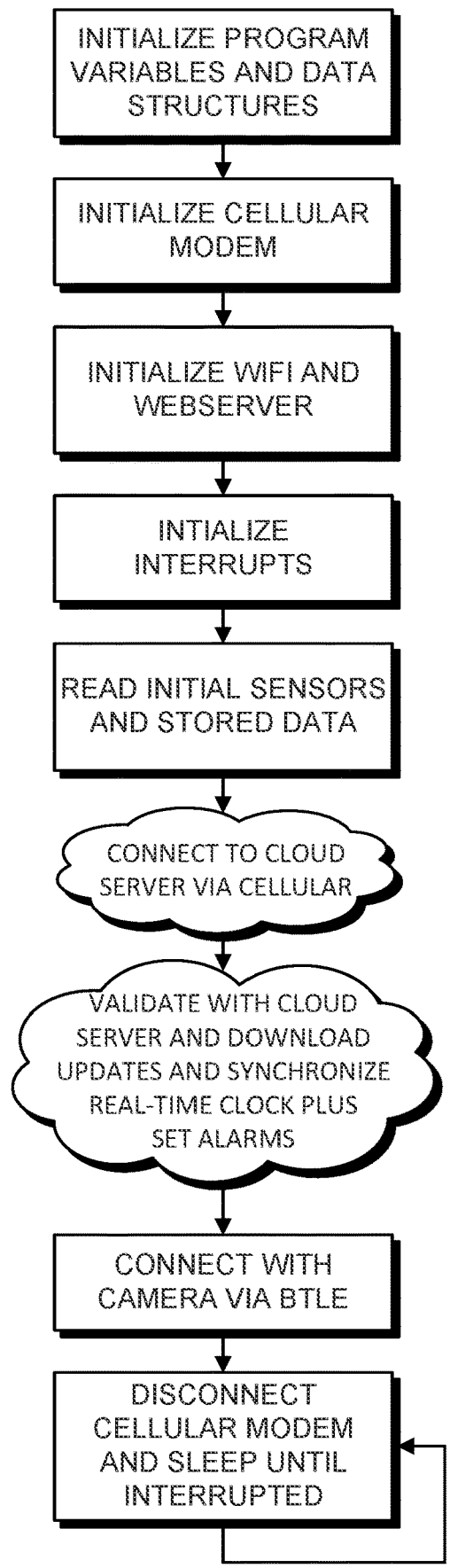
FIG. 4 is a flowchart of the initialization and set up of the system.
Figure 5A:
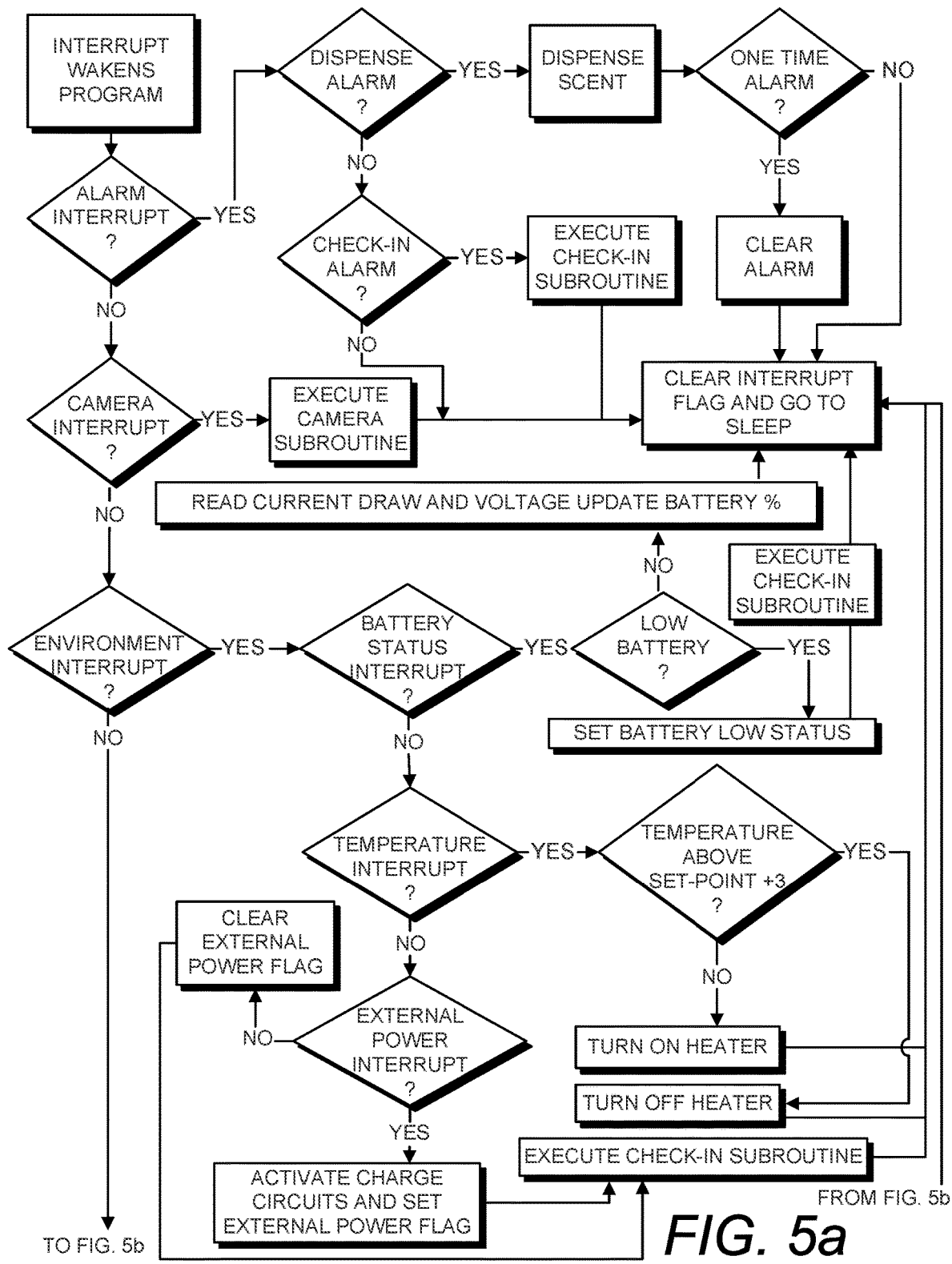
FIG. 5a-5b are flowcharts for the scent dispenser main program logic flow.
Figure 5B:
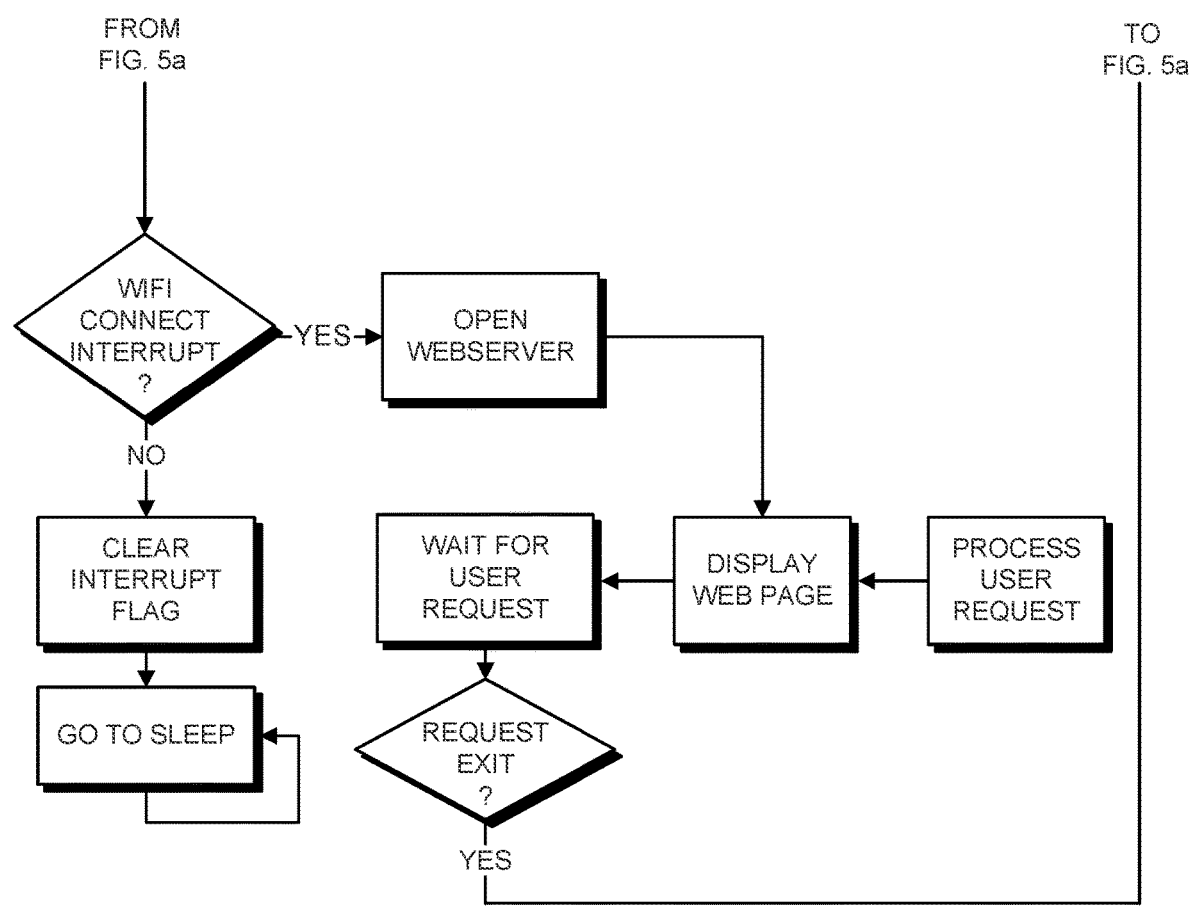
Figure 6:
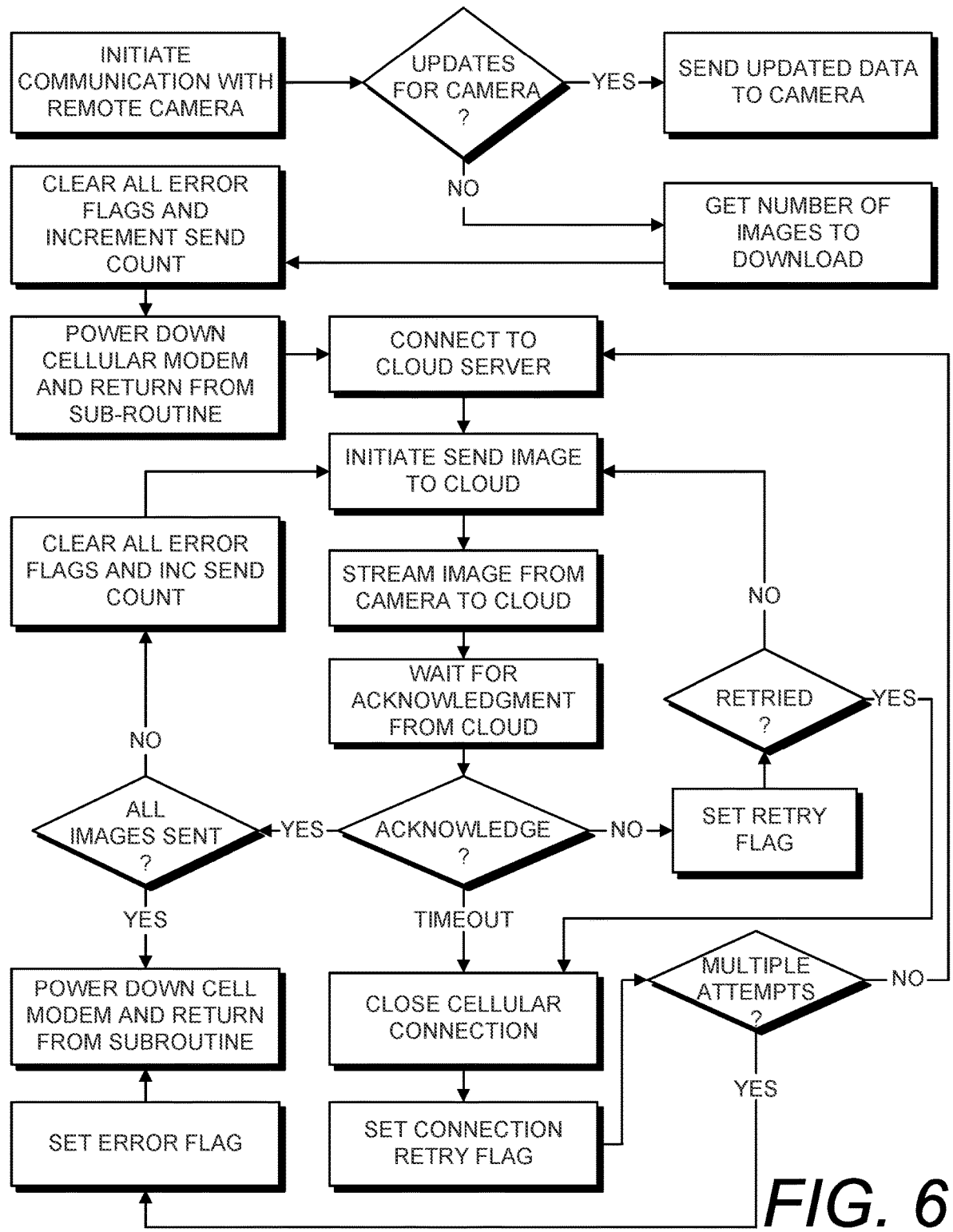
FIG. 6 is a camera routine flowchart.
Figure 7:
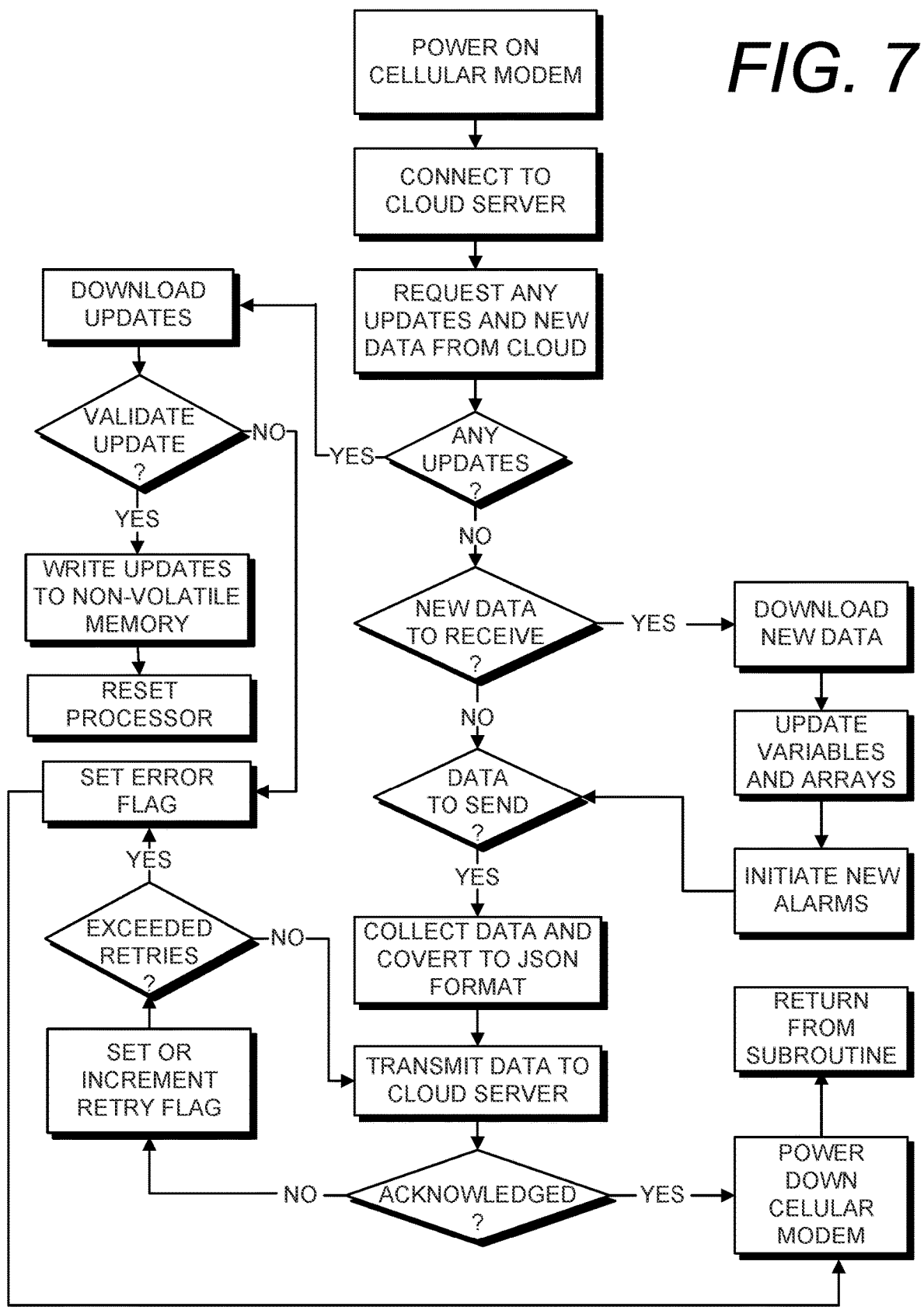
FIG. 7 is a check-in subroutine flowchart.
Figure 8:
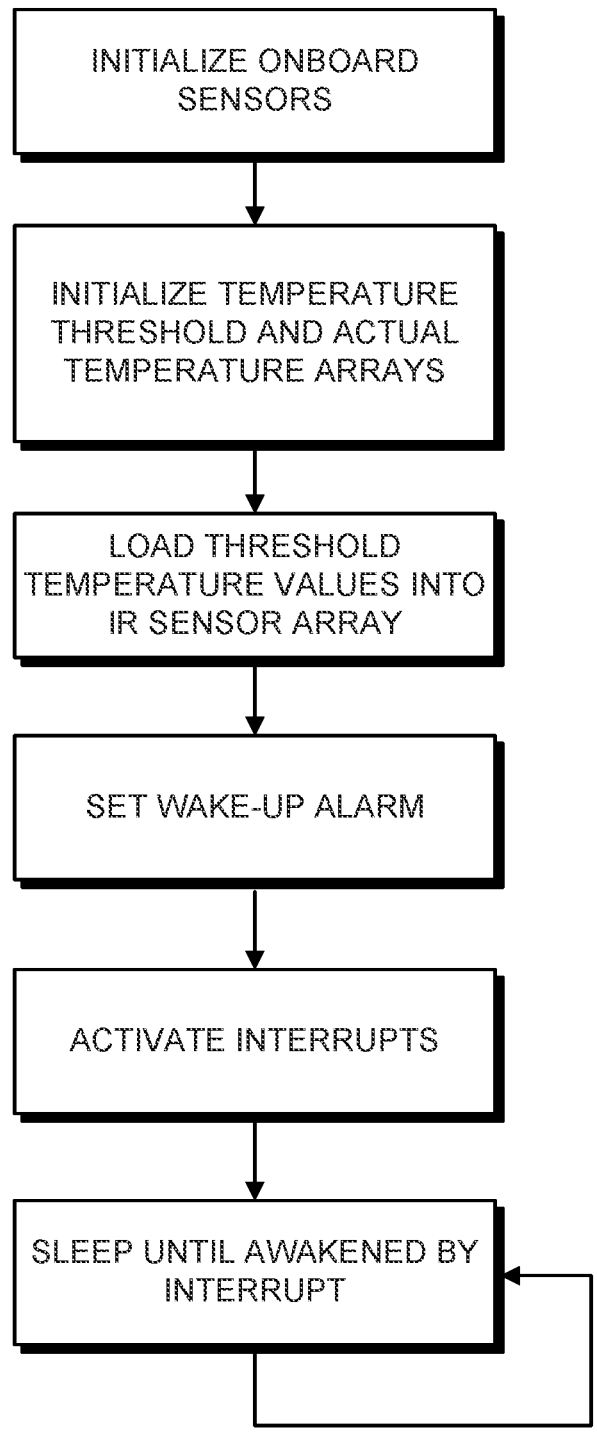
FIG. 8 is a flowchart for an external camera main program logic flow initialization sequence.
Figure 9A:
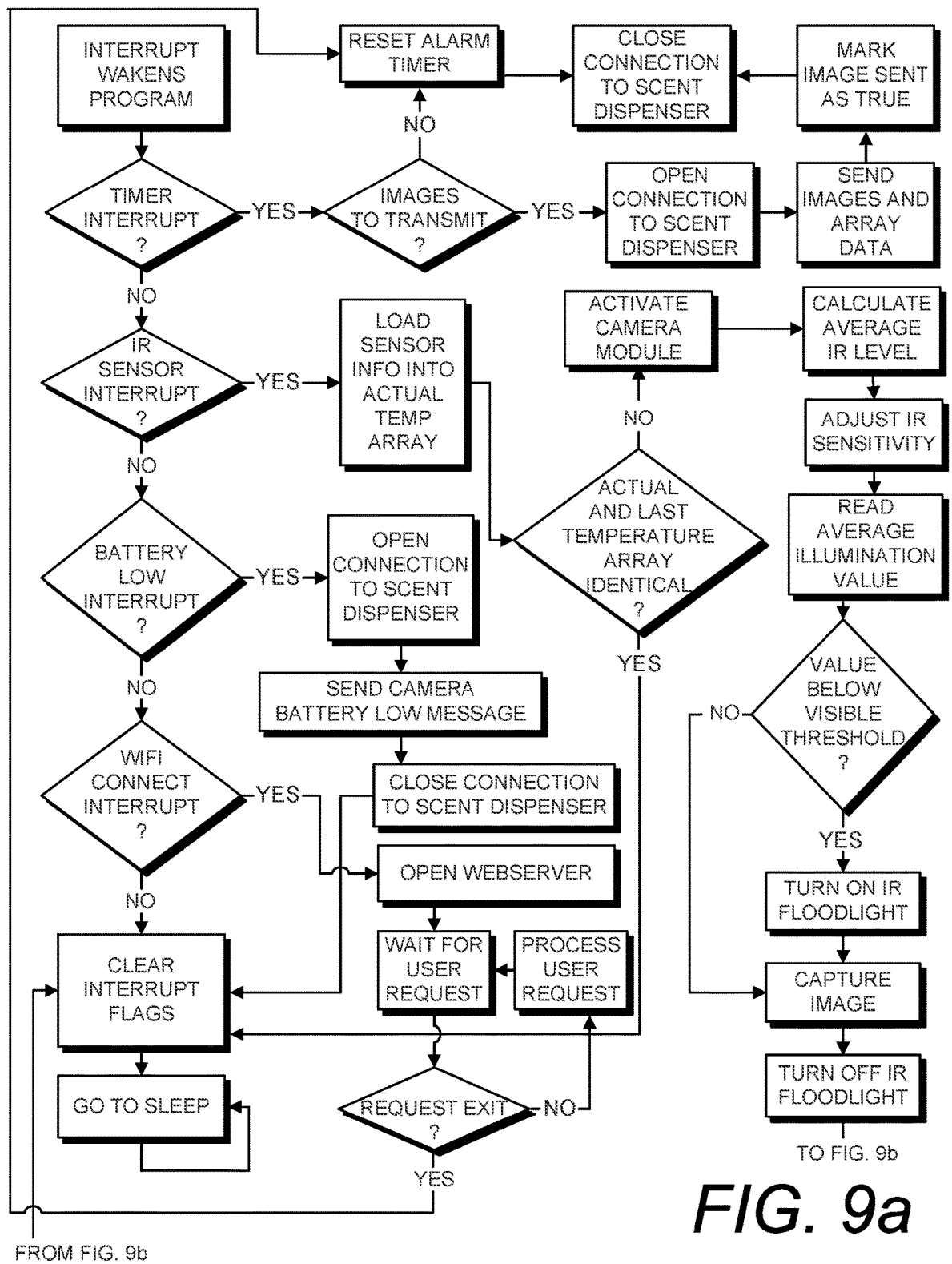
FIGS. 9a-9b are a flowcharts for the external camera main program logic flow.
Figure 9B:
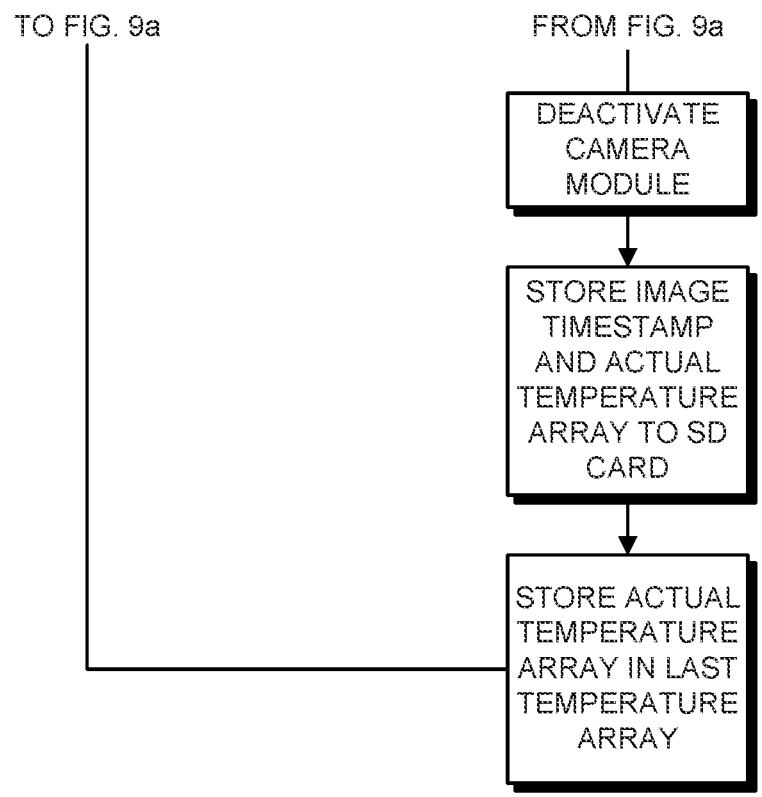
Figure 10:
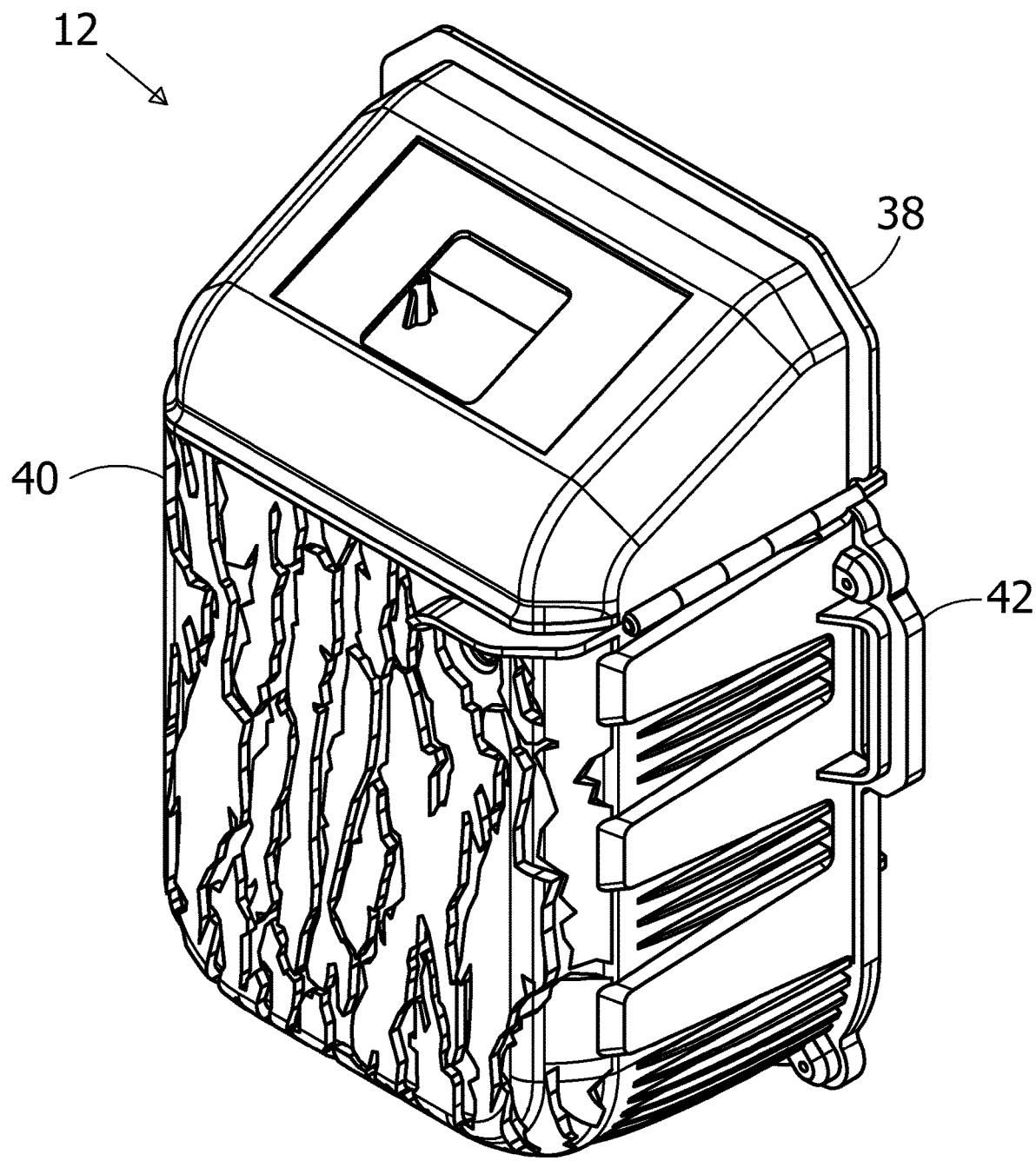
FIG. 10 is a front, upper, right-side perspective view of a main system component of the sensory output and location monitoring system.
Figure 11:
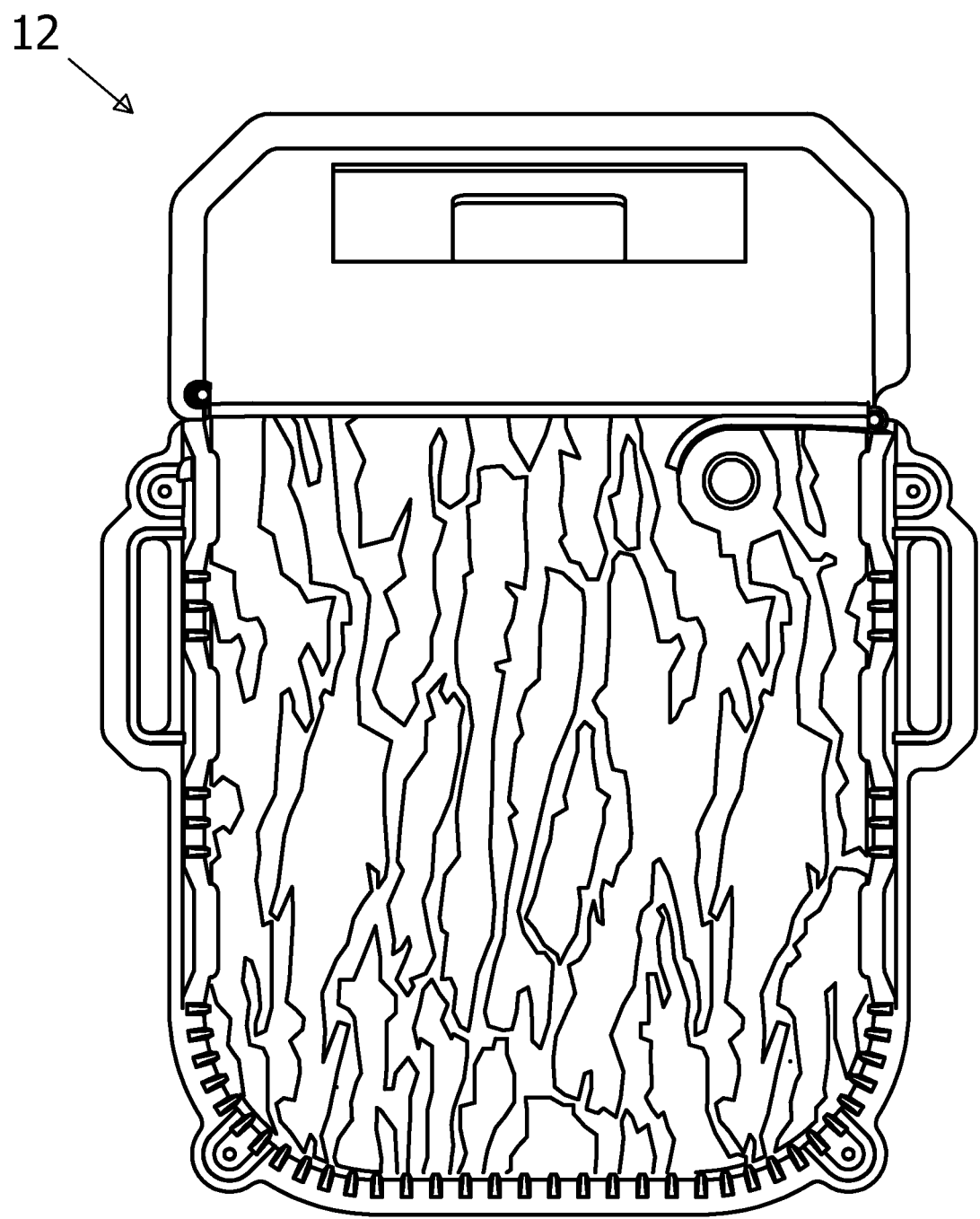
FIG. 11 is a front view of the main system component.
Figure 12:
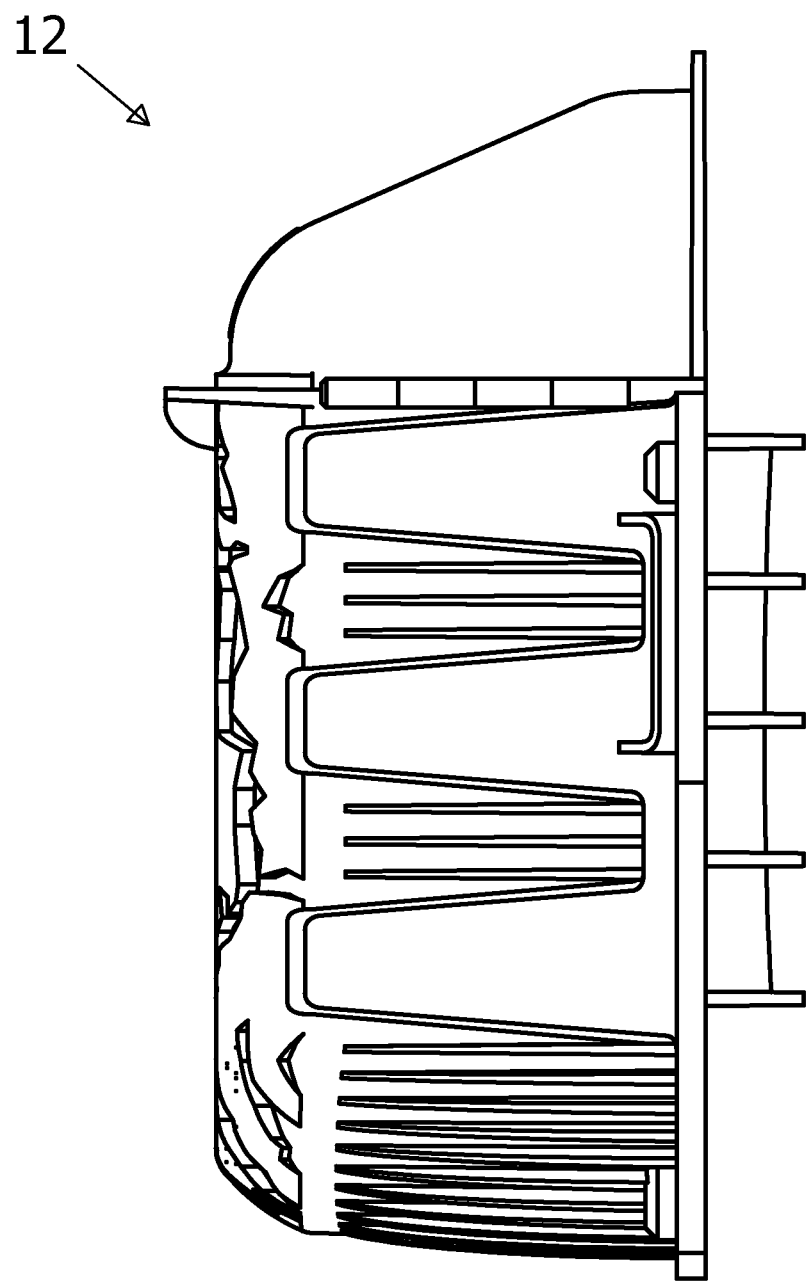
FIG. 12 is a right side view of the main system component.
Figure 13:
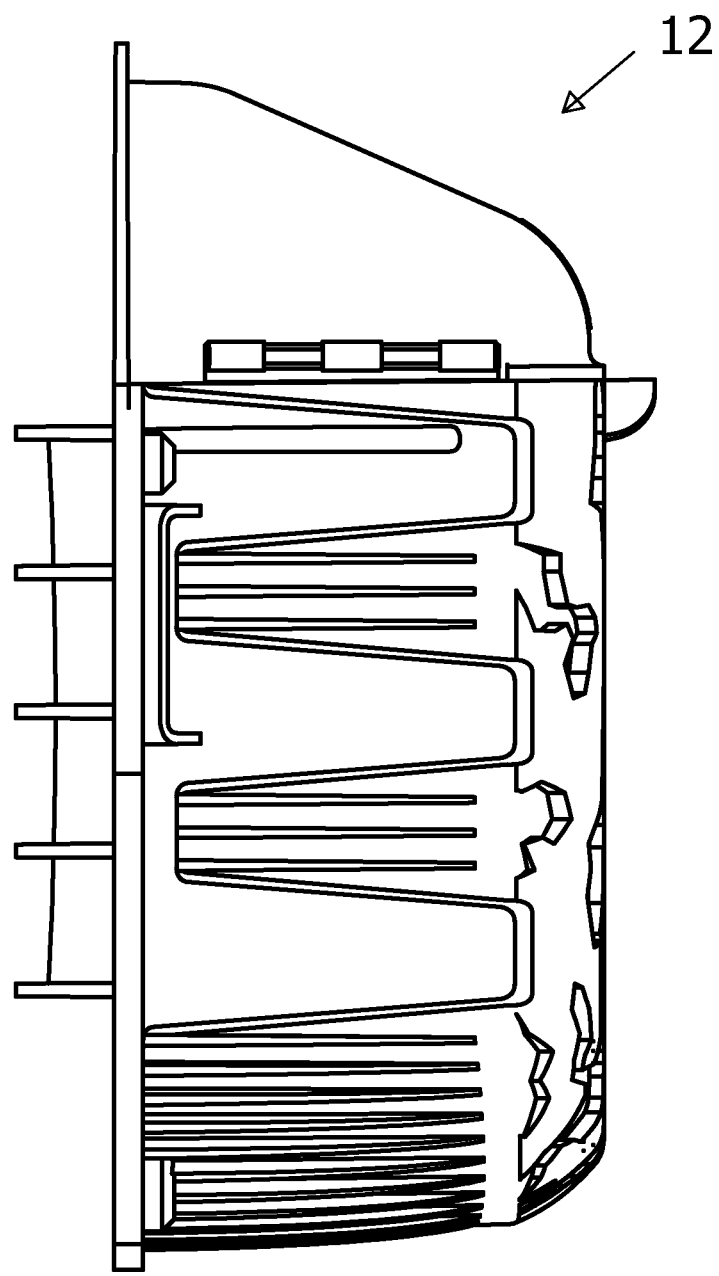
FIG. 13 is a left side view of the main system component.
Figure 14:
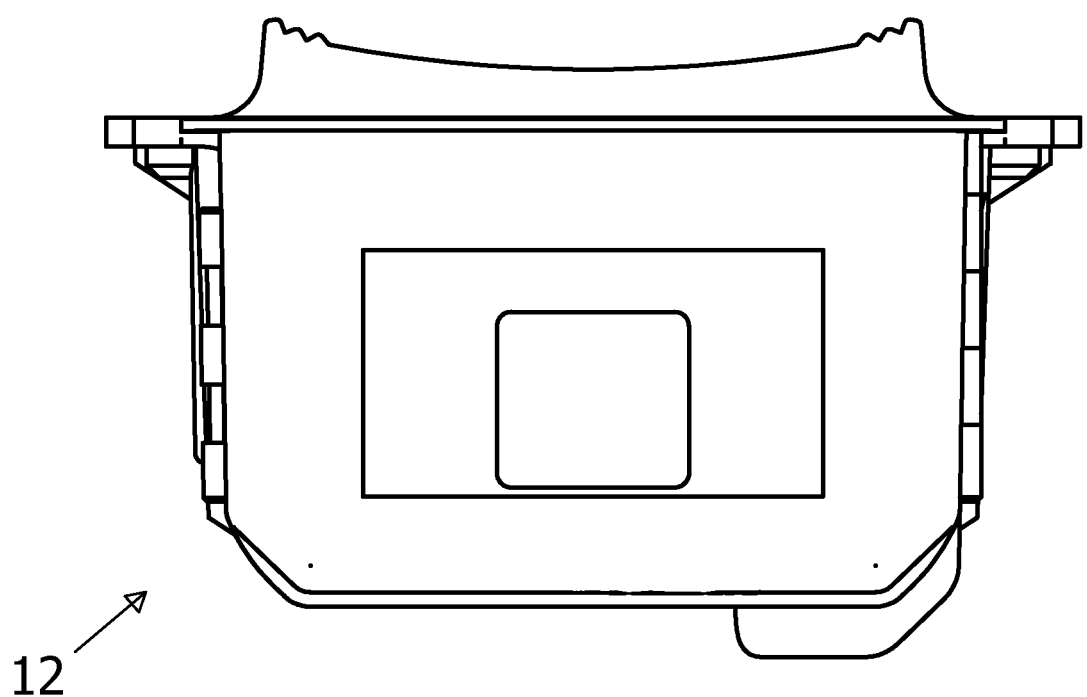
FIG. 14 is a top view of the main system component.
Figure 15:
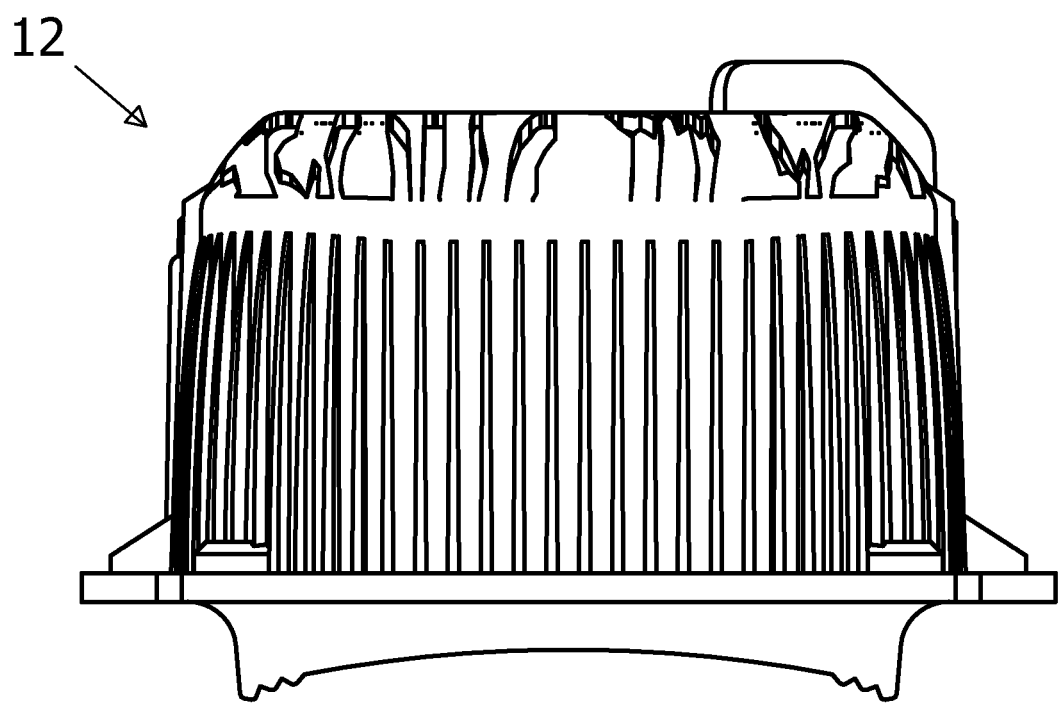
FIG. 15 is a bottom view of the main system component.
Figure 16:
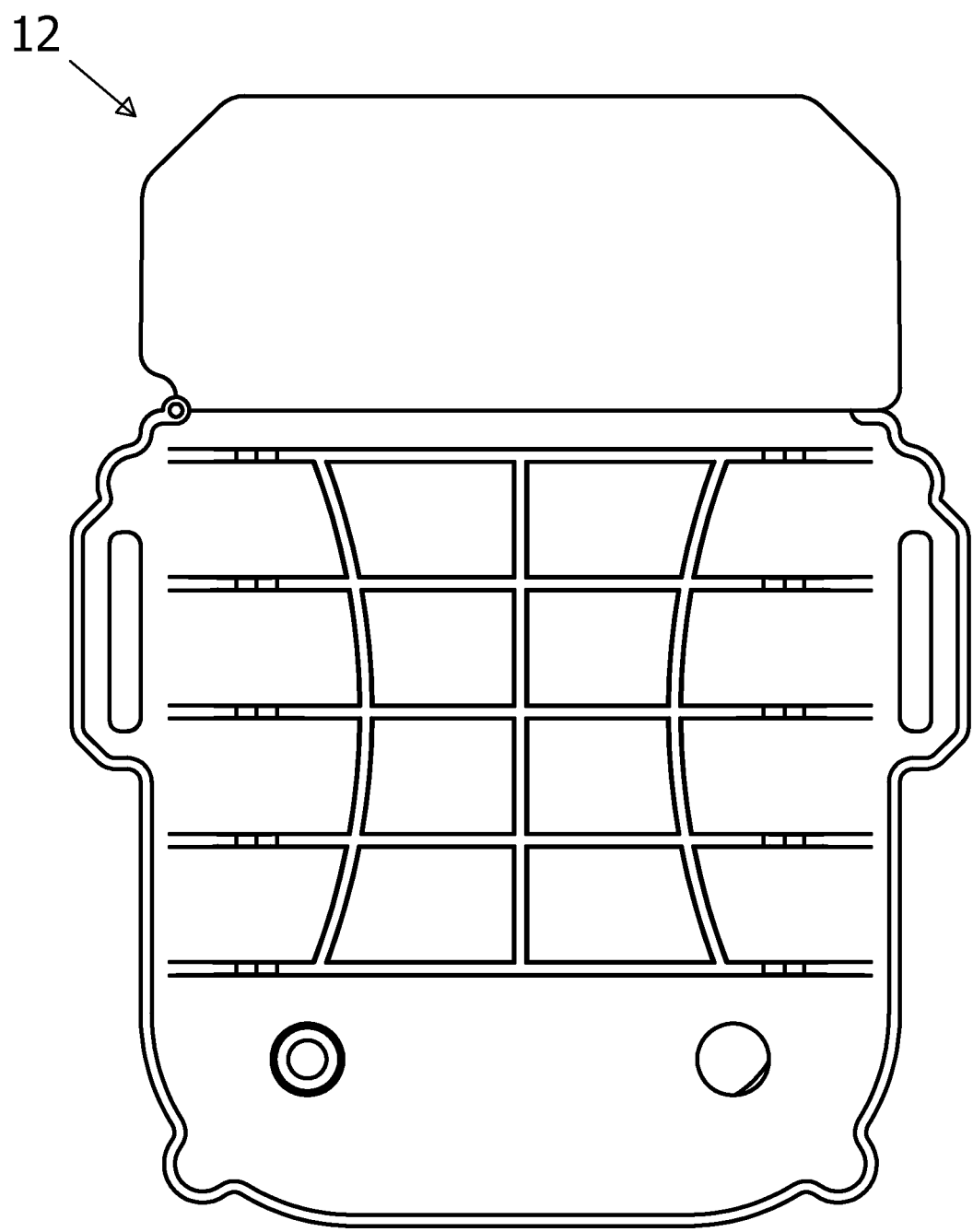
FIG. 16 is a back view of the main system component.
Figure 17:
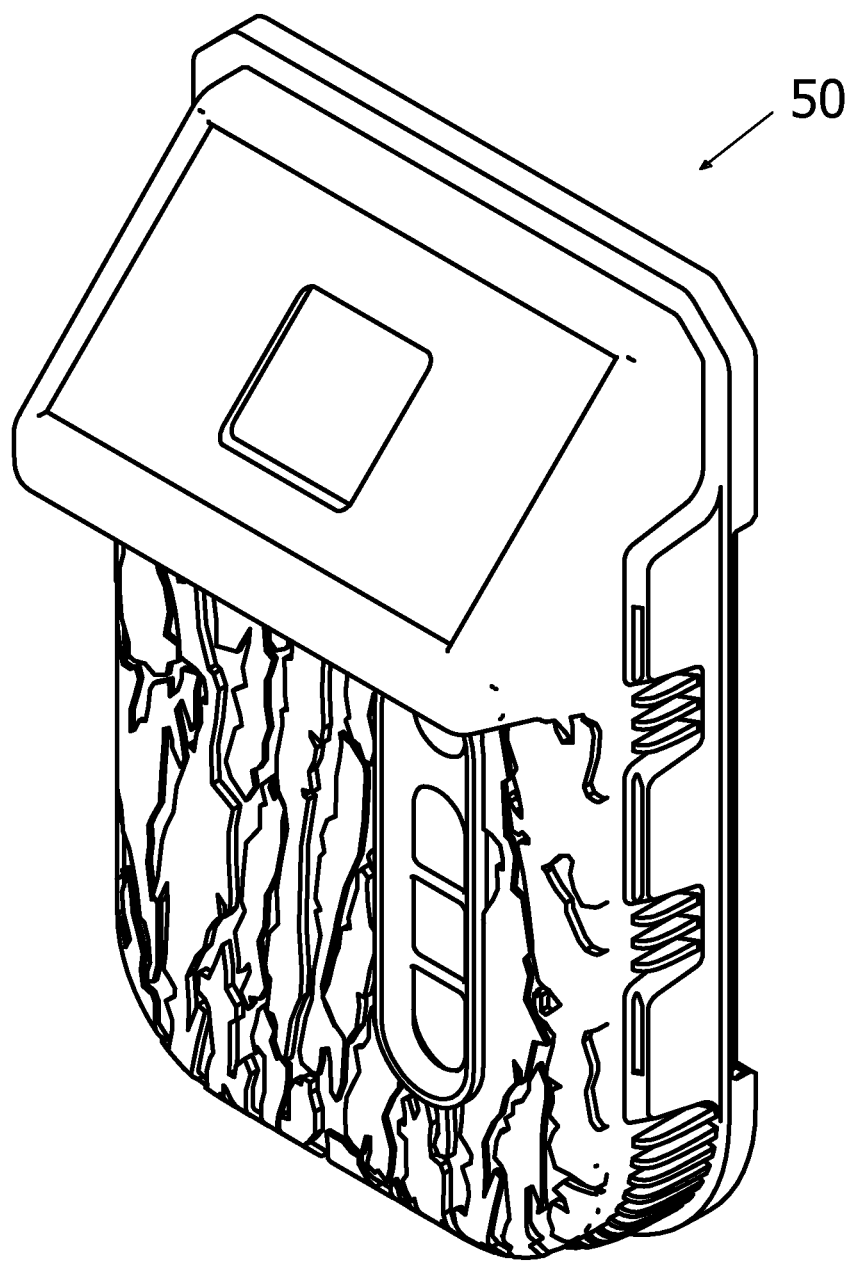
FIG. 17 is a perspective view of a remote camera component.
Figure 17A:
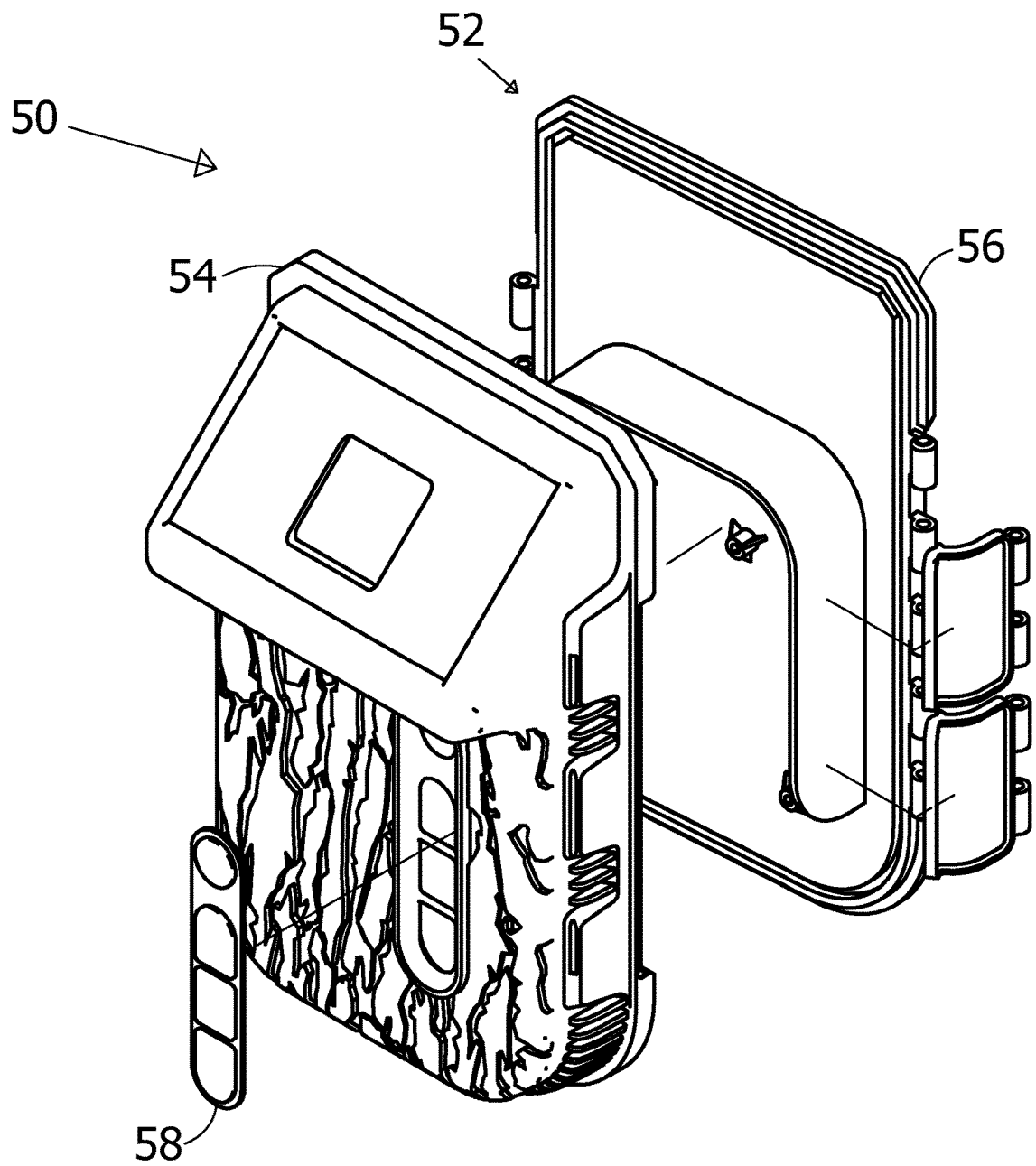
FIG. 17a is an exploded isometric perspective view of a remote camera component.
Figure 18:
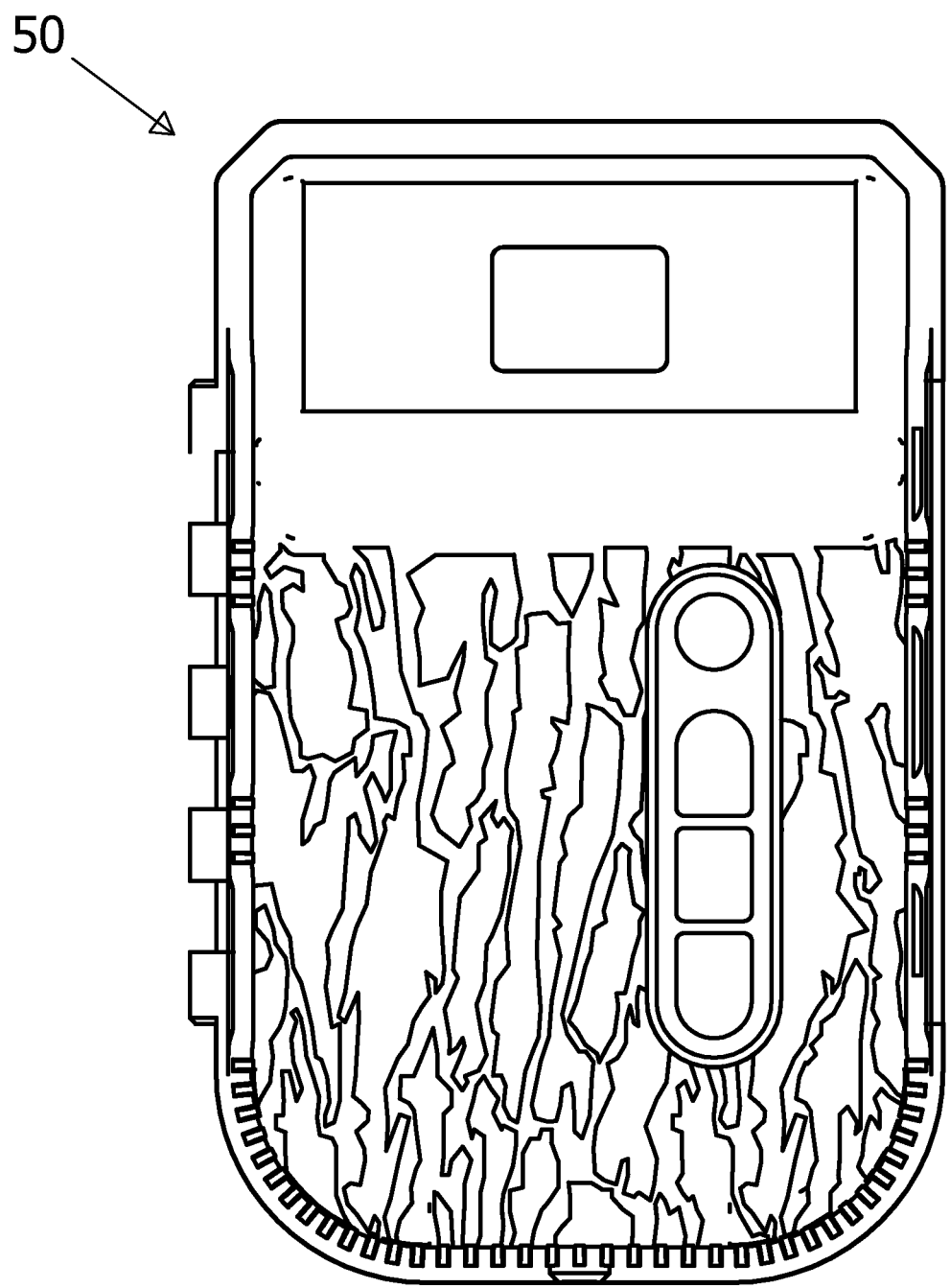
FIG. 18 is a front view of the camera component.
Figure 19:
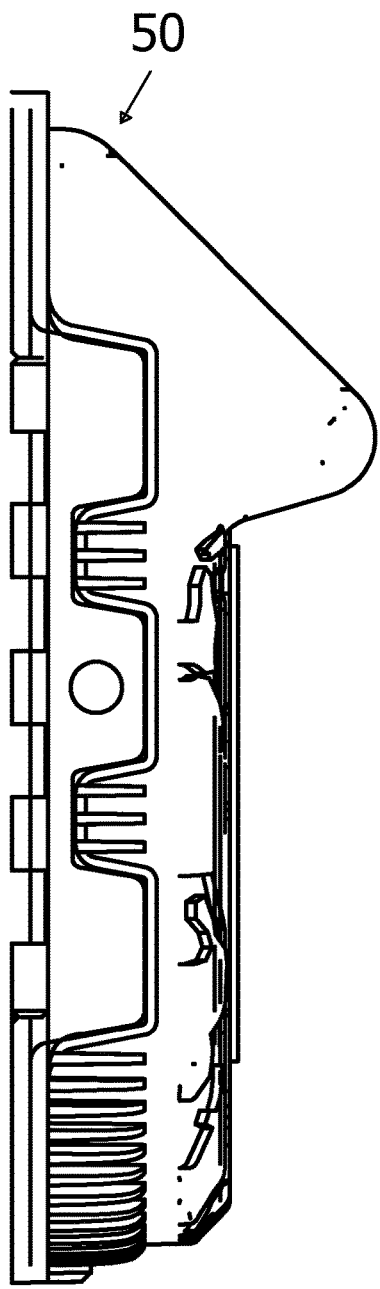
FIG. 19 is a left side view of the camera component.
Figure 20:
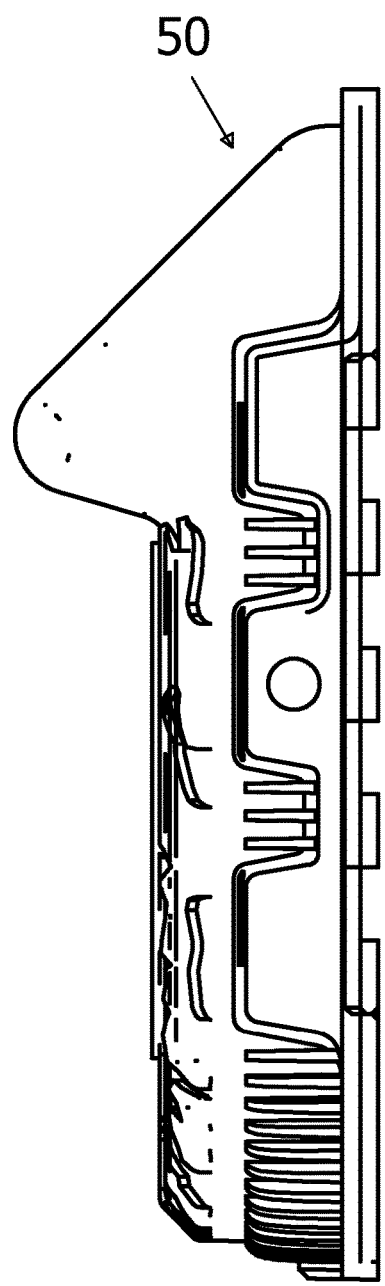
FIG. 20 is a right side view of the camera component.
Figure 21:
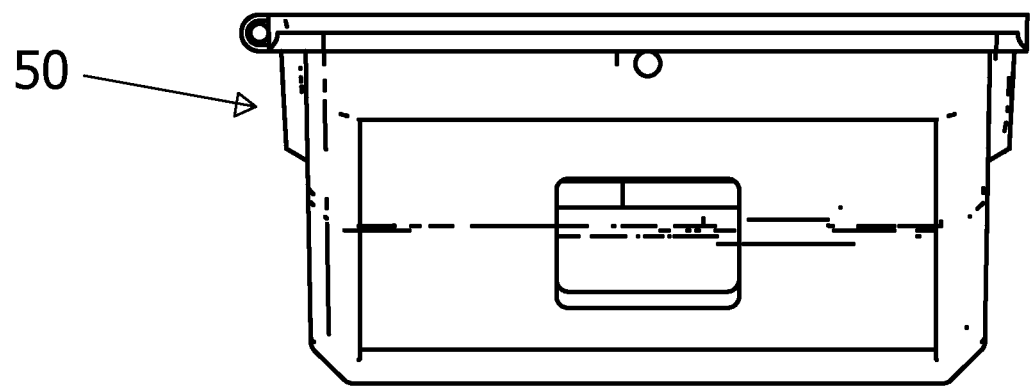
FIG. 21 is a top view of the camera component.
Figure 22:
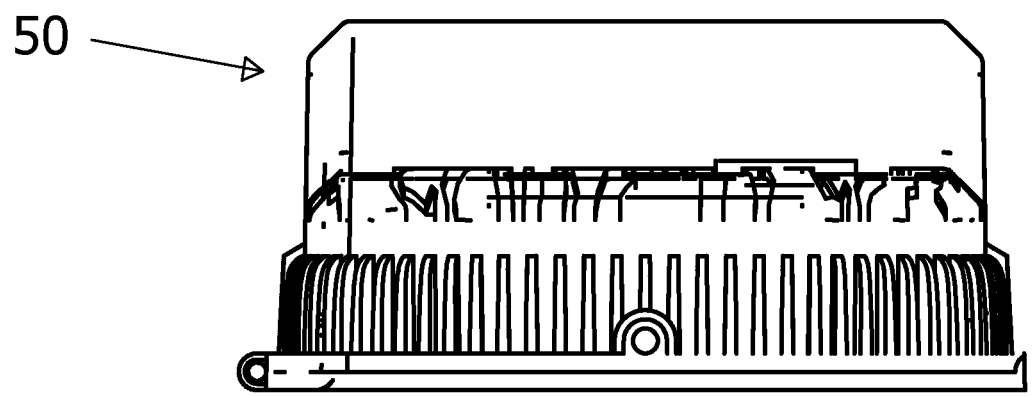
FIG. 22 is a bottom view of the camera component.

FIG. 4 shows a flowchart for a method embodying an aspect of the present invention, which can be implemented with the system 10. An app can remotely control filling and refilling dispensers connected to the scent pump from scent storage reservoirs or vessels, which can be integral with the dispensers, comprising scent pumps and scent dispersal nozzles. For example, hunters can activate the dispensers at predetermined times daily to condition nearby game animals to habitually inspect an area for potential mating does and intruding bucks. By establishing and reinforcing such habitual behavior, hunters can increase their prospects for harvesting game animals in successful hunts. For example, hunters can entice game animals to visit blind sites regularly throughout a work week and improve their prospects of harvesting game animals over weekends during daylight hours in hunting seasons. Hunters and trappers can thus effectively utilize available time for hunting and trapping based on the observed movements and habits of the game animals of interest Moreover, selectively operating the dispenser and the cameras can effectively conserve electrical power. For example, the system can be fully operational on days selected for hunting. Selective operation of the system can be timed to train the game animals to appear at predetermined times. Game harvests can thus be optimized.

IV. Scent Dispenser 12

FIGS. 10-16 show the scent dispenser 12, which also includes the central processor and other components. A scent dispenser housing 38 is configured for disassembly to access internal components. An external surface pattern 40 can be provided for concealing the scent dispenser 12. In wooded hunting areas, scent dispensers 12 can be mounted on tree trunks, e.g., with straps extending through housing strap loops 42. The scent dispenser 12 can be equipped with a heater and the housing 38 can be insulated to protect liquefied scents contained therein from freezing.

V. Camera 50

FIGS. 17-22 show the construction of the camera 50, with a housing 52 including a front cover 54 and a back plate 56. A lens assembly 58 is mounted on the housing front cover 54 and can accommodate the IR array described above. A photovoltaic solar cell 60 is placed in an upper portion of the housing front cover 54, which can be suitably angled to optimize solar exposure.

VI. Adaptive Communications Infrastructure

Because of the numerous complications in communicating within a forested or rough terrain environment typically encountered during wildlife hunting, a very adaptive and self-healing type of communications network is required. Similar issues occur in urban environments where internet of things (IOT) sensors are deployed for numerous monitoring of the environment conditions including, air quality, traffic movement and congestion, energy management, security and many other applications.

Such networks of devices need to be able to autonomously add or remove nodes as well as be able to bridge to other communications media for long-range transmission of data. Because the devices are frequently located in valleys or nodes are separated by buildings or terrain with no line-of-sight available, this network allows the media bridges to be located on higher ground or in line-of-sight and devices to transmit to them, and thus on to the long-range networks such as cellular or satellite. The following system was designed to meet these requirements.

Data to be transmitted across this network include images captured by cameras, environmental data, motion triggers, scent dispenser logs, dispenser programming, network management, network setup, error messages and acknowledgments. Because of terrain, cellular service is many times unavailable in valleys. To facilitate users' communications, VOIP1 messaging is also supported.

Bridging to other physical communication infrastructures is provided for Bluetooth, Wi-Fi, Cellular, ethernet, fiber optic and similar methodologies using media bridges. Virtual communications protocols supported include, TCP\IP2, GSM3, NB/IOT4 and NetBIOS5. Other virtual protocols can be easily added through a virtual API6.

Figure 23:
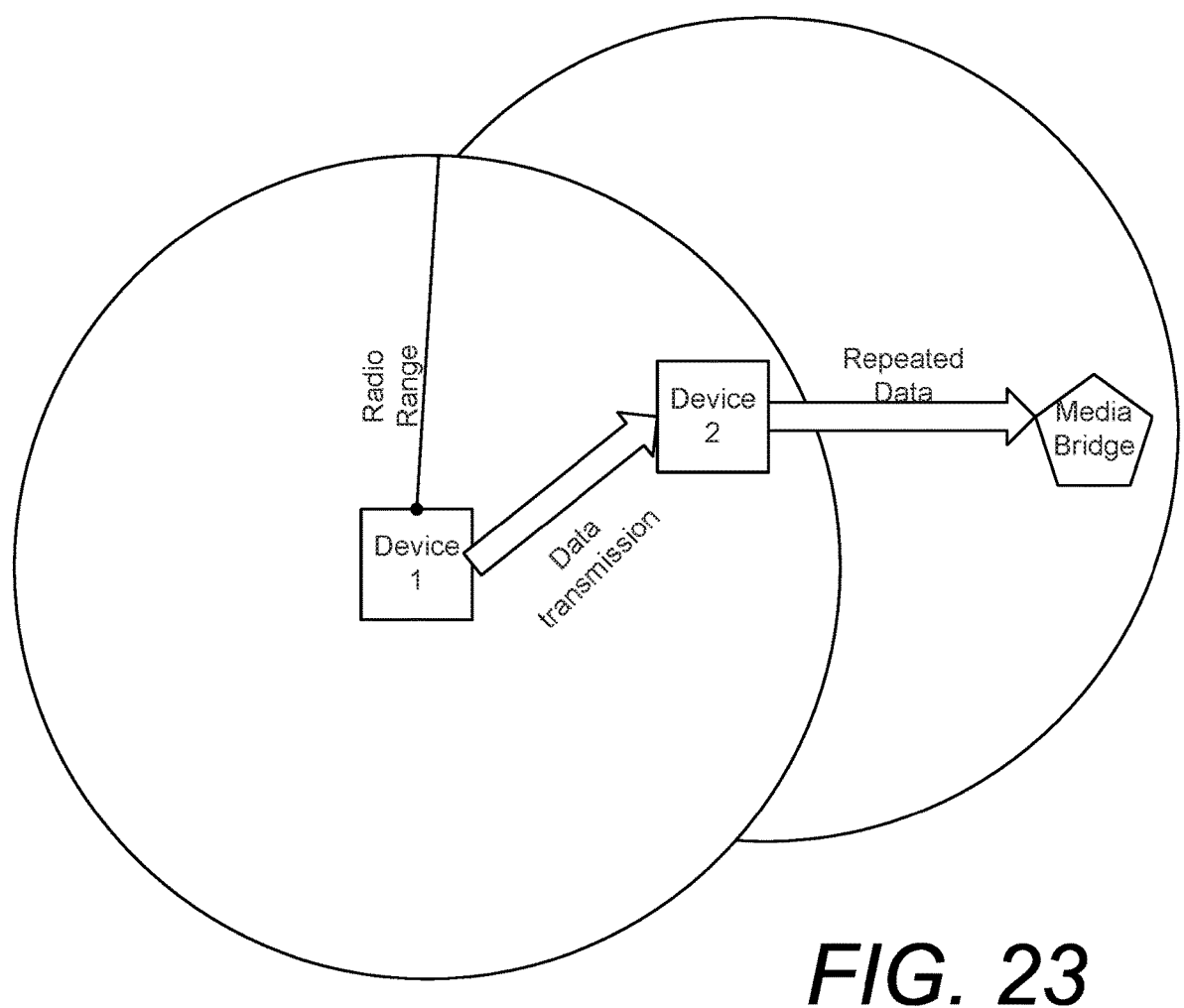
FIG. 23 is a schematic of a typical two device network.
Figure 24:
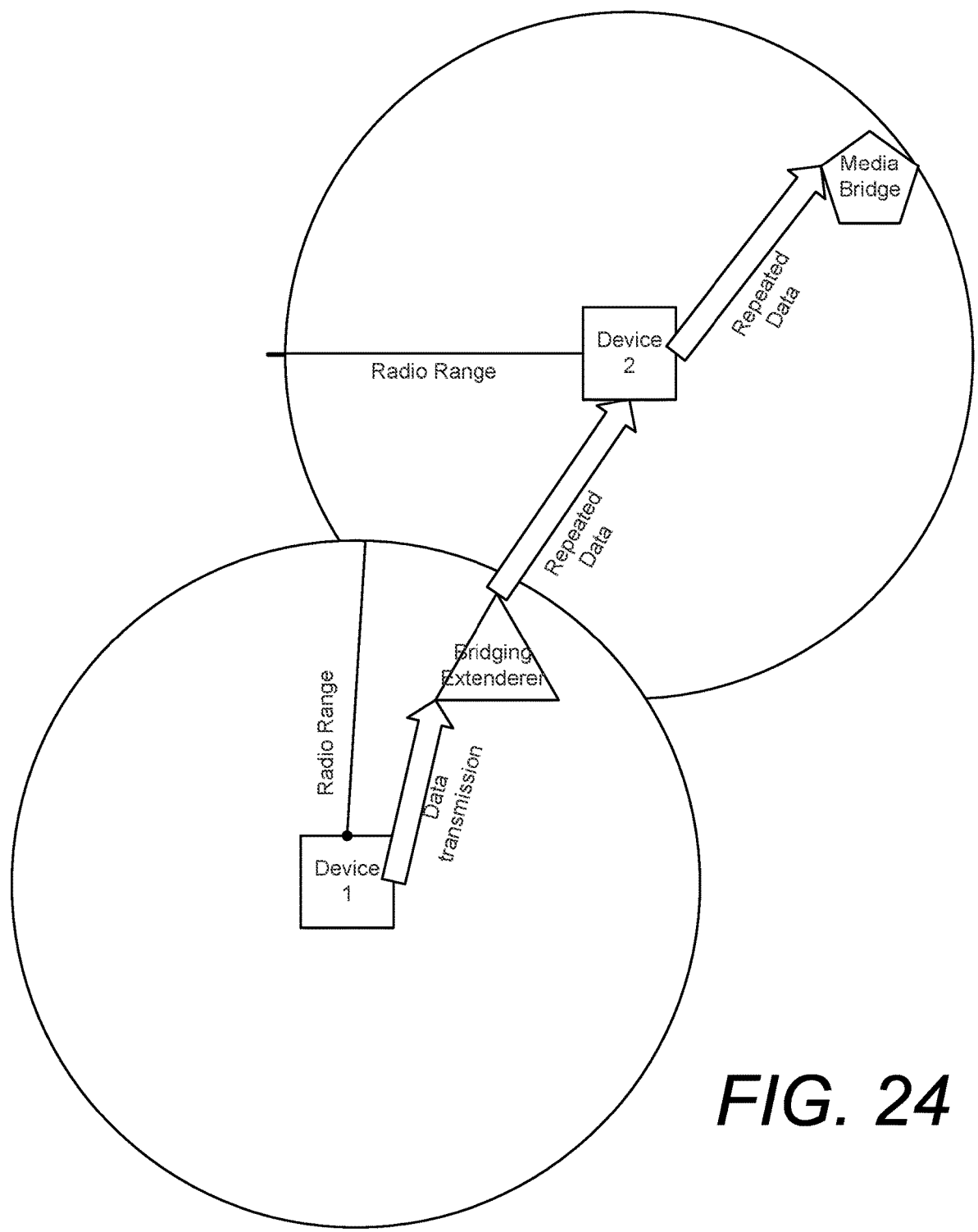
FIG. 24 is a schematic of a typical two device network with a bridging extender.
Figure 25:
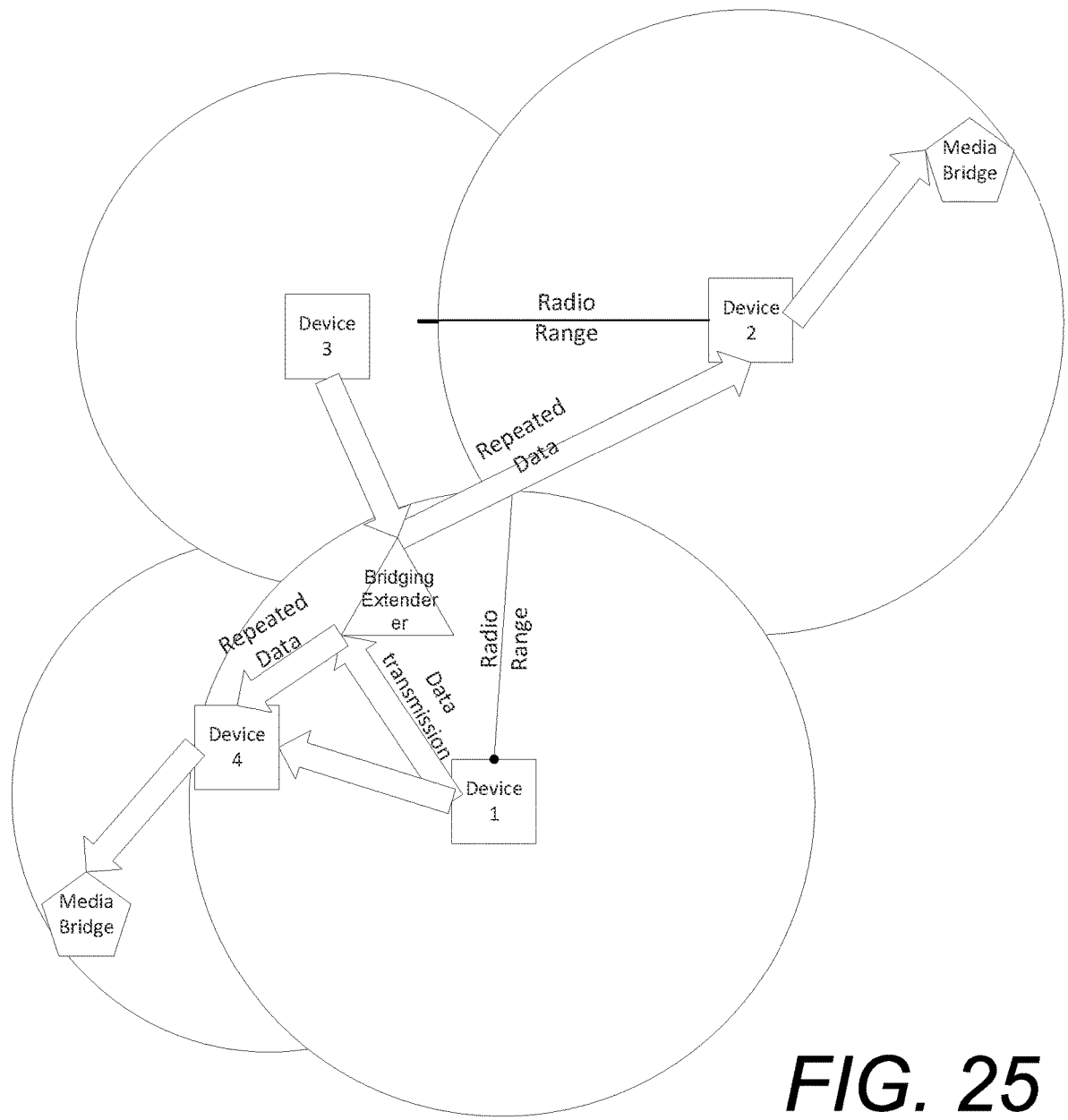
FIG. 25 is a schematic of a typical four device network with two media bridges and one bridging extender.

The implementation of the network consists of at least one media bridge device and one scent dispenser, wildlife camera or sensor unit. Additional dispensers and cameras can be added, along with bridging extenders. FIG. 23 shows a typical two device network. FIG. 24 shows a typical 2 device network with a bridging extender. FIG. 25 shows a typical 4 device network with two media bridges and one bridging extender. Transmission distances are typically determined by the type of antenna used with most devices using a flexible whip antenna with an anticipated range of 300 meters, with long range units using a directional Yagi type antenna with ranges up to 15 Km.

The radio units used in this solution consist of the appropriate RF components and a small microcontroller to handle communication and security/encryption functions This microcontroller handles all the mesh network management and node management along with packet error handling. This microcontroller also provides the capability of 15 pins of digital i/o, 4 pins of analog input and 2 pins of analog output.

Table 1 shows possible pin use of the boards i/o pins:

TABLE 1

| Pin name/function | Physical pin # | Programmatic pin designator |
| --- | --- | --- |
| DIO0, AD0 | 20 | D0 |
| DIO1, AD1 | 19 | D1 |
| DIO2, AD2 | 18 | D2 |
| DIO3, AD3 | 17 | D3 |
| DIO4 | 11 | D4 |
| DIO5 | 15 | D5 |
| DIO6 | 16 | D6 |
| DIO7 | 12 | D7 |
| DIO8 | 9 | D8 |
| DIO9 | 13 | D9 |
| DIO10, PWM0 | 6 | P0 |
| DIO11, PWM1 | 7 | P1 |
| DIO12 | 4 | P2 |
| DIO13 | 2 | P3 |
| DIO14 | 3 | P4 |

(D = digital; I = input; O = output; AD = analog input; PWM = pulse-width modulation)

The board is designed to provide this functionality without the need for an additional processor locally. This allows a sensor platform to consist of only the sensors and a radio module. The device can be programmed from the media bridge or remotely through the bridge. Once programmed, the radio unit can send sensor data inputs at preset intervals, and actuate outputs based on received data packets.

The 900 MHZ frequency band is used for network communications, with 64 channels available in the US. The network will automatically choose the channel to use based on interference/noise across the network's physical location. Nodes can be automatically added or removed from the network and signals will automatically reroute if a node becomes unavailable. If multiple bridge devices are available, the system will also automatically re-route all traffic if a bridge becomes unavailable.

To reduce power consumption and extend battery life, the network will go into a sleep mode if nothing is transmitting at the time, waking up automatically every 1 minute (or other predetermined interval) to transmit any data queued and then return to sleep. If real-time data such as VoIP1 communications are occurring, the sleep mode will be disabled until such streaming is complete. This sleep method will extend battery life by approximately 4000% during normal operations.

To reduce transmission errors, all transmissions of data and commands are handled through packets. Each packet includes the destination and source addresses, the packet type, packet length and a checksum for error detection. All packets are acknowledged for receipt by the destination and will be resent if no acknowledgement is received or a non-acknowledgement is received. The source unit will attempt to resend up to three times, at which time it will send a re-route command to all units and force a reset of routing bit. Routing is determined by the RSSI7. Each device will send a test signal when a reset command is received, and all units will determine RSSI7 for all units in its range. The units will also determine the best route to each media bridge based on RSSI7 and number of hops required. This allows the network of units to create a "mesh" of communication channels and determine the optimum transmission routes for each signal. Because intermittent transmission losses and spurious noise, this method allows the network to adjust for numerous environmental issues and equipment malfunctions. New devices can be added to the network by requesting a network reset.

Typical frame communication protocols rely on the start delimiter and length bytes to differentiate frames. If bytes in a packet are lost, the length count will be off, and the next API frame (packet) will also be lost. By utilizing escaped operation involving escaping character sequences in a frame, we can improve reliability, especially in noisy RF environments. The basic frame structure is the same as typical frame communications, but by using escaped mode, all bytes except for the start delimiter must be escaped if needed. The following data bytes must be escaped in this mode:

0x7E: Start delimiter (if part of frame data)

0x7D: Escape character

0x11: XON

0x13: XOFF

Escaped mode guarantees all the 0x7E bytes received are start delimiters: this character cannot be part of any of the other frame fields (length, data, or checksum) since it must be escaped.

To escape a character:

1. Insert 0x7D, the escape character.
2. Append it with the byte to be escaped, XORed with 0x20. The length field does not include any escape character in the frame and the checksum is calculated with non-escaped data.

Example

To escape a standard frame:

| Start Delimiter | Length | Frame Type | Frame Data | Check sum |
| --- | --- | --- | --- | --- |
| 7E | 00 0F | 03 | 01 00 ▓ A2 00 40 AD 14 2E FF FE 02 4E 49 | 6D |

The 0x13 byte must be escaped:

1. Insert a 0x7D.
2. XOR the byte 0x13 with 0x20: 13⊕20=33.

This is the resulting frame. Note that the length and checksum are the same as the non-escaped frame.

| Start Delimiter | Length | Frame Type | Frame Data | Check sum |
| --- | --- | --- | --- | --- |
| 7E | 00 0F | 03 | 01 00 7D 33 A2 00 40 AD 14 2E FF FE 02 4E 49 | 6D |

The preceding example shows the basic frame layout used. All frames will begin with a start delimiter of 0x7E, followed by a two-byte data length, then a frame type, followed by the actual data packet, and finally a checksum. The following frame types are currently defined in Table II:

TABLE II

| Frame type designation | | |
|---|---|---|
| 01x | Command frame | Frame data will be command to execute |
| 02x | Network Reset | Request a network reset |
| 03x | Standard data transmission | Frame data will be actual data |
| 04x | Initiate streaming | Switch to streaming |
| 05x | Acknowledge | Acknowledge received frame |
| 06x | Non-acknowledge | Received frame contains error |
| 07x | Broadcast | A 0x01 frame to be sent all nodes |
| 08x | Initiate VOIP | A frame containing SIP data for VOIP |
| 09x | VOIP data stream | Frame containing streaming data |
| 0Ax | Close VOIP data stream | |
| 0Bx | New node request | A new node sends to request addition to network |
| 0B-0F | Reserved for future use | |

All frames will be wrapped in a packet before transmitting which will include: packet start sequence: the following 4 bytes: 0x00, 0x0f, 0x05,0x0A (00000000111111101011010); packet number: an eight-byte identifier; sending node: a sixteen-byte number; destination node: a sixteen-byte number; originating node: a sixteen-byte number; hop number: a single byte; frame data; and the checksum of packet number, sending, destination and originating nodes.

This dual wrapping of data reduces system overhead, because only the wrapper must be decoded by bridge devices, while the frame is just forwarded intact with its error checking intact. Because of the nature of the mesh network, a single frame may be delivered to the destination over multiple routes, so logic is included to only process the first valid frame that arrives based on its packet number.

Frames can be uniquely identified by their packet number and origination node ID. These values are stored in registers by the radio and can be retrieved by firmware. The radio firmware handles most of the communication protocol automatically, including error management and retransmission of corrupted packets.

VII. Command Nodes

Tables III and IV describe the command frames:

TABLE III

| Start Byte | command | length | Command data | Checksum |
|---|---|---|---|---|
| 05x | XX | XX XX | XX XX XX | XX |

Start byte: a synchronization byte consisting of alternating 0's and 1's
Command: a byte defining the operation to be performed based on the following Table IV:

| Command Byte | Description | Arguments | Response Arguments | Response Required |
|---|---|---|---|---|
| 01x | picture data transfer initiate | picture filename | Ack/nack[8] | Y |
| 02x | Picture transfer complete | Picture filename | Ack/nack[8] | y |
| 03x | Update time | Datetime | Ack/nack[8] | y |
| 04x | Set dispense time | Time | Ack/nack[8] | Y |
| 05x | Delete dispense time | Time | Ack/nack | y |
| 06x | Set heater setpoint | Setpoint | Ack/nack[8] | y |
| 07x | Read temp | | Current temp | Y |
| 08x | Read batt volt | Internal or external | Current batt voltage | y |
| 09x | Read battery level | Internal or external | Current battery % | y |
| 0Ax | Read remaining fluid | | % of scent fluid remaining | y |
| 0Bx | Read light level | | % of light level from solar cell | Y |
| 0Cx | Read rssi[7] | Radio # | Rssi strength in db | y |
| 0Dx | Read Status | | Current status data | y |
| 0Ex | Read sensor log | Motion Dispense error | Required log data | y |
| 0Fx | Not used | | | |
| 10x | Set dispense amount | # of seconds to dispense | Ack/nack[8] | Y |
| 11x | Enter sleep mode | # of seconds | | n |
| 12x | Set motion sensitivity | Sensitivity level | | y |
| 13x | Reset device | | | n |
| 14x | Reset to factory default | | | n |
| 20x | Device initiated | Error codes | | y |
| 21x | Power failing | Internal or external | | n |
| 30x | Motion trigger | | | n |
| 31x | Sensor trigger | Sensor# | | Y |
| 32x | Read sensor | Sensor# | Sensor value | y |
| 33x | Set sensor limit | Sensor# Upper & lower limit | | |
| 34x | Set sensor-i/o config | Sensor # Config data | Ack/nack[8] | y |
| 35x | Output data on i/o line | i/o line # data | Ack/nack[8] | y |
| 77x | System error | Error codes | | n |

Length: a two-byte integer of total length of command data
Command data: the commands arguments this may be variable length.
If no arguments are required, a value 00x will be sent as the command data.
Checksum: The checksum of the command data.

In one embodiment of the solution, a network of cameras, scent dispensers and bridges are deployed in a wildlife environment to lure animals to certain locations. The dispensers are used to lure the specimens to the location and the cameras are used to record the outcome of the lure.

In a second embodiment of the solution, a network of sensor platforms is implemented in an environment to monitor specific environmental conditions such as air quality over a large area or traffic patterns.

A third embodiment of the solution is a network of cameras and sensors placed to provide security and monitoring of an area, possibly multi-building. Using the appropriate sensors and transducers, a real-time-tracking solution can be implemented and building automation system can be created with minimal programming necessary.

A fourth embodiment of the solution is any multi room building and/or multi building complex. Individual bridging extenders with appropriate sensors and actuators attached are placed in all rooms, communicating with a central computer possibly using artificial intelligence, to create a complex wide building automation, energy management, security, and access control system with high redundancy. Such a system including voice operated personal assistants can produce "smart technology" with interactive voice command and response, making a very easy to use system for the complexes residents.

VIII. Conclusion

It is to be understood that while certain embodiments and/or aspects of the invention have been shown and described, the invention is not limited thereto and encompasses various other embodiments and aspects.

The invention claimed is:

1. A sensory output and location monitoring system comprising:
   an on-premises subsystem including:
      a central processing unit (CPU) configured for receiving inputs and providing outputs;
      an email and telecommunication server connected to said CPU;
      a database server connected to said CPU;
      a World Wide Web (Internet) server connected to the Internet and said CPU;
      a commerce server connected to said CPU;
      a management, access and security component connected to said servers; and
      firewall, router and security components connected to said servers;
   an off-premises subsystem including:
      a scent dispensing system connected to said CPU and including a scent tank, a pump connected to said scent tank and a dispensing nozzle connected to said pump, said dispensing nozzle configured for dispensing a scented liquid from said scent dispensing system;
      temperature sensor connected to said CPU and configured for providing ambient temperature input to said CPU;
      a humidity sensor connected to said CPU providing ambient humidity input to said CPU;
      said CPU configured for providing output to said scent pump corresponding to ambient temperature and humidity;
      a heater connected to said scent tank and said CPU, said heater configured for maintaining the contents of said scent tank above freezing;
      a camera connected to CPU, said camera including an infrared (IR) emitter array configured for illuminating a target and an IR sensor array configured for sensing IR signals corresponding to target and providing corresponding output to said CPU; and
      said CPU configured for causing said scent dispensing system to dispense said scented liquid in response to receiving a signal from said sensor corresponding to the presence of a target; and
   a fiber-optic trunk connecting said on-premises and said off-premises subsystems.

2. The system according to claim 1 wherein said power source includes at least one of a solar cell and a battery.

3. The system according to claim 2 wherein said system is configured for placement in remote, off-grid areas.

4. The system according to claim 1 wherein said sensor comprises a passive infrared sensor.

5. The system according to claim 1, which includes:
   a SanDisk (SD) memory card configured for providing input to said CPU.

6. The system according to claim 1, which includes a camera configured for providing an image of at least one of an animal, an object and an individual as input to said CPU.

7. The system according to claim 1 wherein said sensory output comprises at least one of an olfactory, audible, or visual output.

* * * * *